United States Patent Office 3,248,971
Patented May 3, 1966

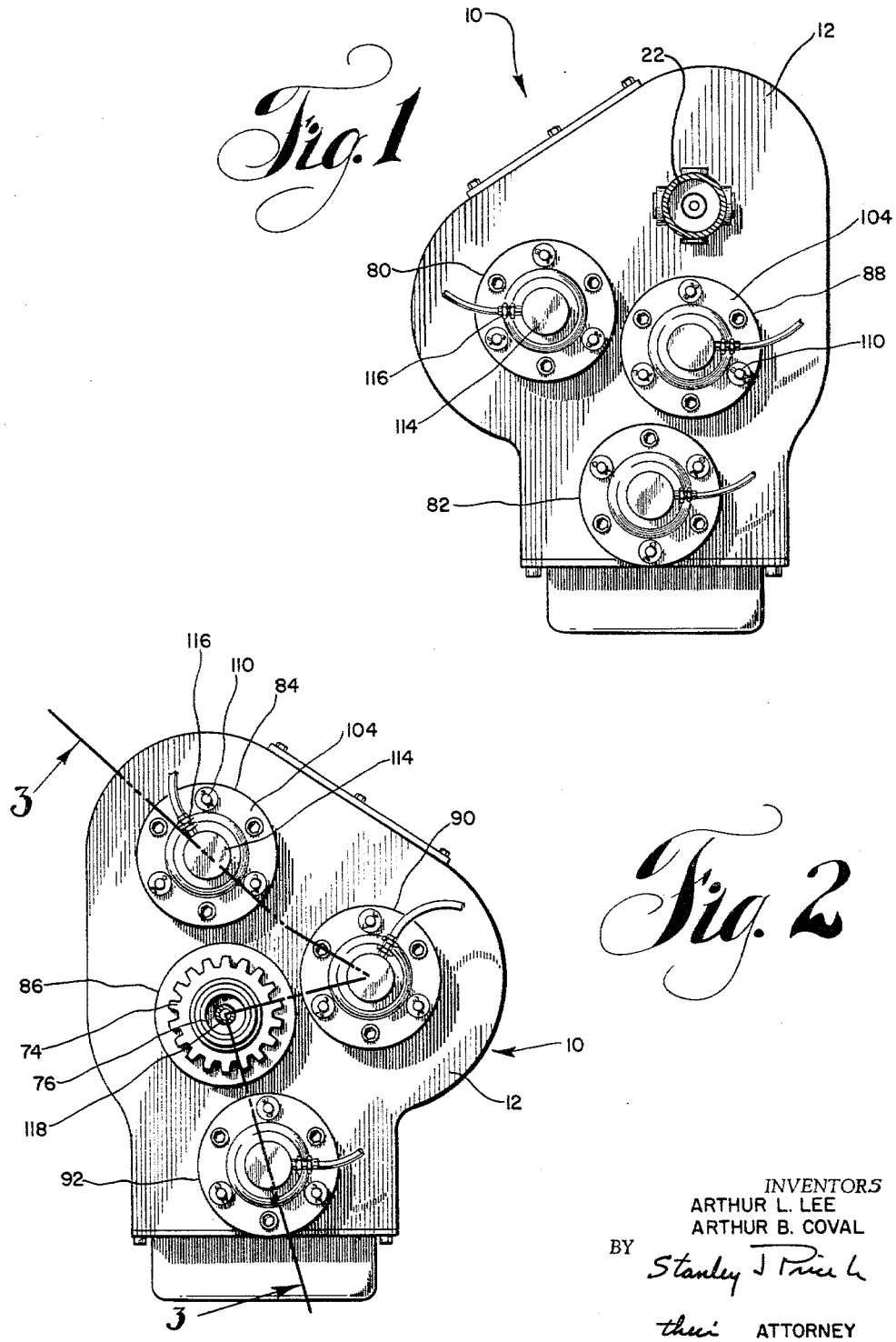

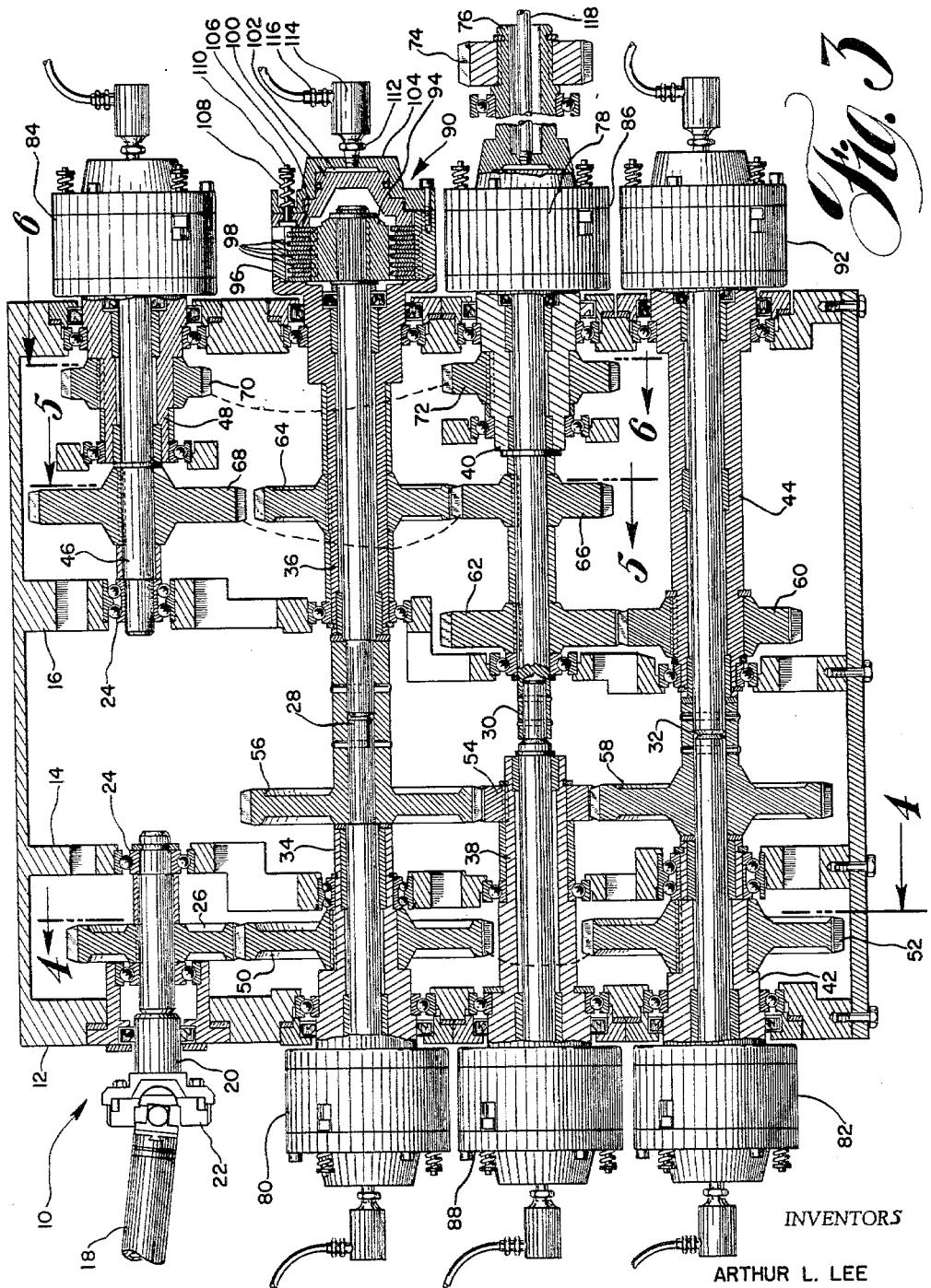

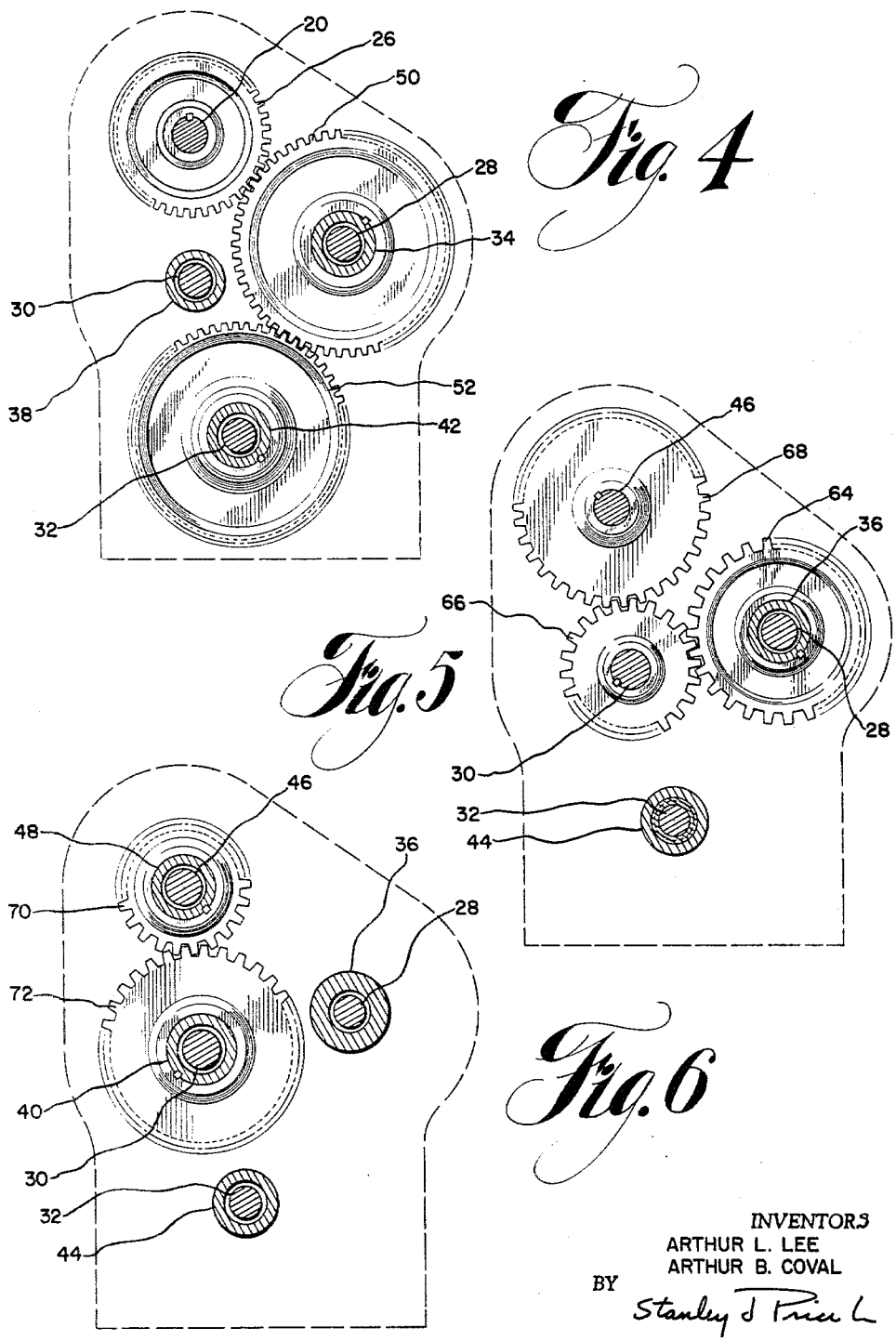

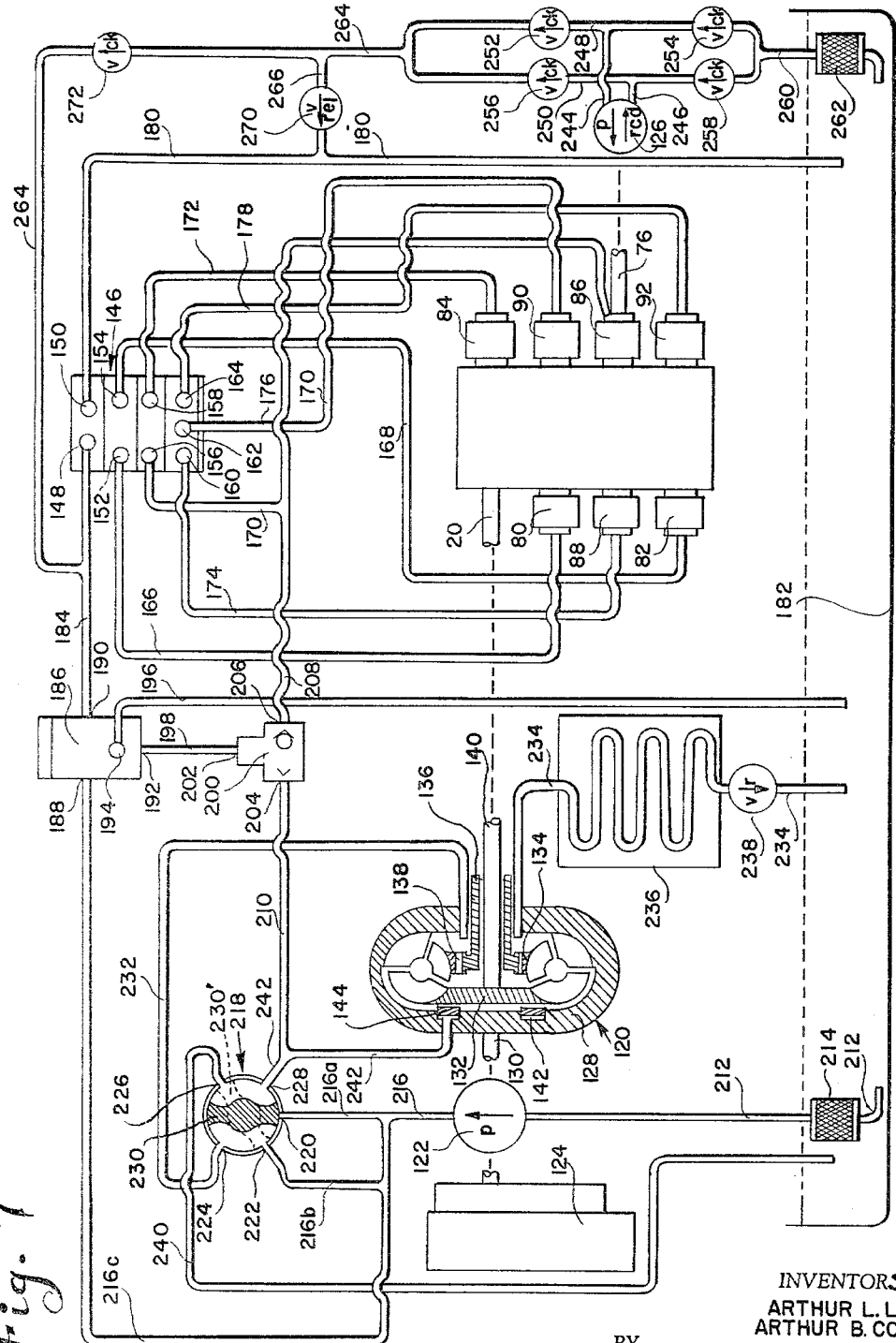

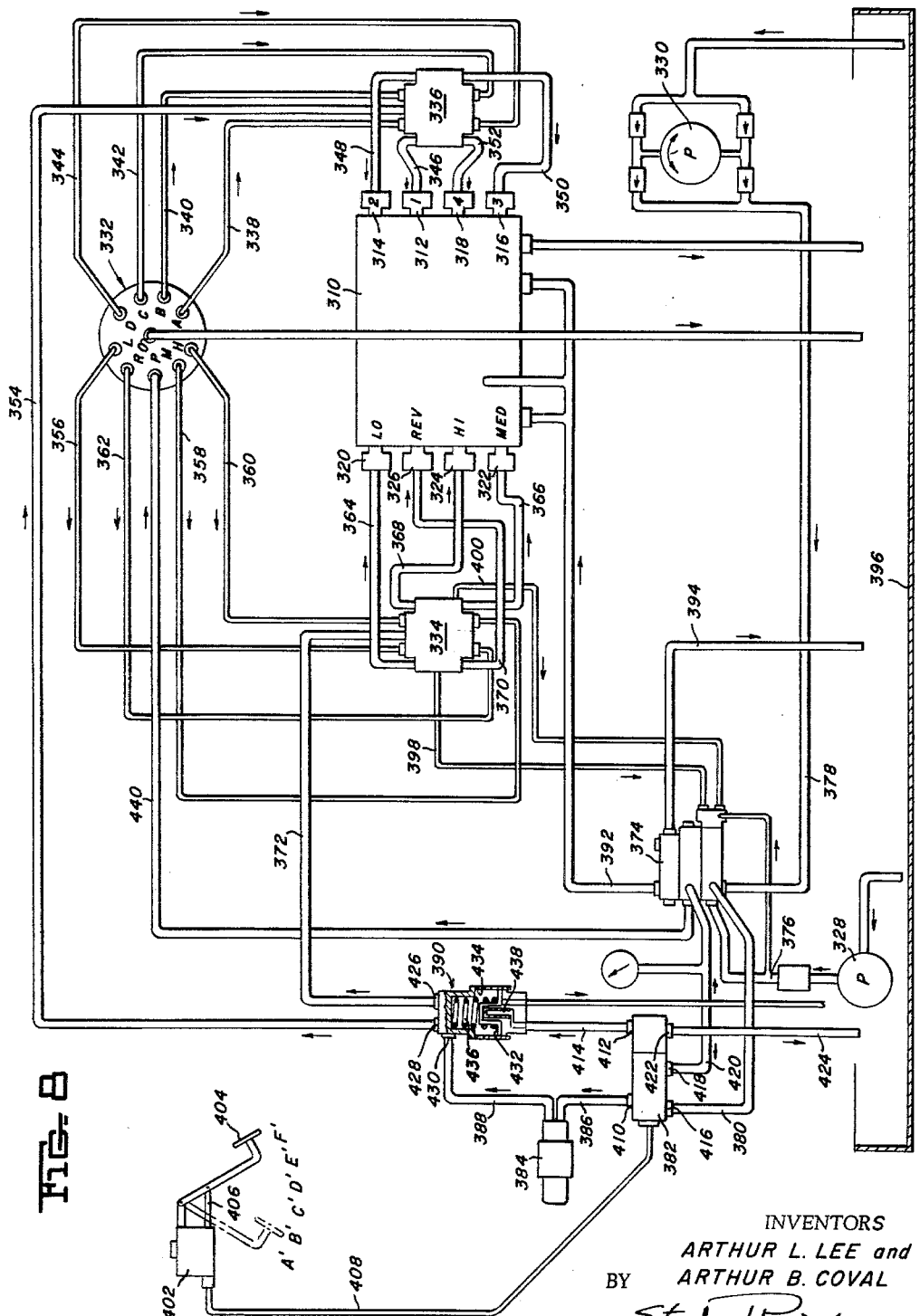

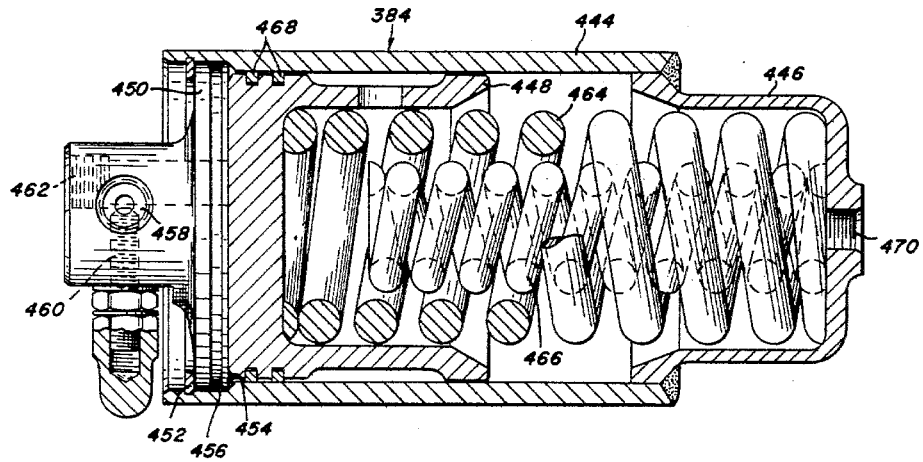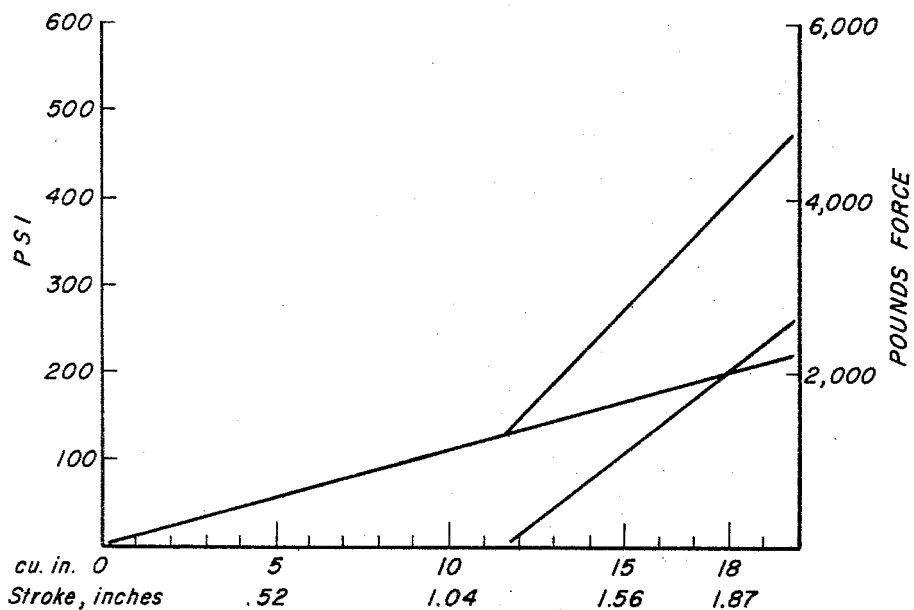

3,248,971
CONSTANT MESH TRANSMISSION AND HYDRAULIC ACTUATING CIRCUIT THEREFOR
Arthur L. Lee and Arthur B. Coval, Columbus, Ohio, assignors to Consolidation Coal Company, Pittsburgh, Pa., a corporation of Pennsylvania
Filed Mar. 1, 1963, Ser. No. 262,797
20 Claims. (Cl. 74—732)

This invention relates to a hydraulic actuating circuit, and more particularly to a constant mesh transmission having a plurality of speed ratios and a controlled pressure actuating circuit to effect shifting from one speed ratio to another.

This application is a continuation-in-part of our copending U.S. patent application S.N. 3,786 filed January 21, 1960, which in turn was a continuation-in-part of U.S. patent application S.N. 734,167 filed May 9, 1958, both now abandoned. This application, in many of its particulars, discloses an invention that is an improvement of the hydraulically controlled transmission disclosed in U.S. Reissue Patent No. 24,327 dated June 11, 1957, issued to A. L. Lee.

The transmission shown and described in the above named Lee patent has three speed ratios in the forward direction and three speed ratios in the reverse direction. This speed arrangement has proven very satisfactory in haulage type vehicles that are employed in shuttle type haulage work. The present transmission is an improvement of the above named transmission in that three additional speed ratios are added in each direction of the transmission thereby providing a transmission that is suitable for extremely heavy duty haulage under steep grade conditions wherein a greater number of gear ratios are required to provide efficient vehicle operation. Although we have added three additional speeds in each direction to the transmission disclosed in Reissue Patent No. 24,327, it should be noted that other meritorious features such as the constant mesh gearing and the external clutches taught in the Lee patent are still retained in our improved transmission.

In addition to the provision of three additional speed ratios in each direction of transmission operation, the basic transmission has been improved by the provision of a controlled pressure actuating circuit. The transmission mechanism of the present invention has a plurality of hydraulically actuated clutches which are sequentially engaged to provide alternate drive connections between the transmission input shaft and the output shaft to effect the various transmission speed ratios. The controlled pressure actuating circuit of the present invention provides actuation of the clutches at hydraulic pressures compatible with the magnitude of the torque to be transferred through the clutches at a given speed ratio. Throughout this specification reference will be made to the actuation of hydraulic clutches. The term "actuation" is intended to encompass the conducting of pressurized fluid to the clutches and the maintenance of pressurized fluid therein to engage the clutch. When the clutch is deactuated, the fluid pressure is vented from the clutch and it is disengaged.

The hydraulic pressure applied to actuate a hydraulic clutch and maintain it in an engaged position should bear a functional relation to the magnitude of the torque to be transferred by the clutch. If the hydraulic pressure is disproportionately lower than the torque to be transferred, the clutch will not be engaged with sufficient force to prevent clutch slippage and the full magnitude of the torque will not be transferred through the clutch. If, on the other hand, the hydraulic pressure is disproportionately greater than the value of the torque to be transferred, the clutch will be engaged with excessive force and speed that results in a shock load being transmitted through the transmission. This shock load can result in damage to the transmission and/or the clutch. Further, the excessive force of the hydraulic pressure applied to the clutch in such a situation can cause the clutch to stick in the engaged position so that even though the fluid is vented to release it, it remains engaged or partially engaged and disrupts the efficient operation of the transmission.

To provide smooth shifting of the transmission from one speed ratio to another, the transmission clutches should be actuated by fluid at pressures that are sufficient to maintain the clutches in engagement without clutch slippage, but at pressures no greater than necessary to prevent clutch slippage since excessive actuating pressures result in shock loads that cause rough transmission shifting. The present invention contemplates an actuating circuit which provides clutch actuating fluid at two separate maximum pressure values. A relatively high maximum pressure is provided to actuate certain of the transmission clutches when the torque transferred by them is of greater magnitude. A lower maximum pressure is provided to actuate certain of the transmission clutches when the torque transferred is not so great. A novel pressure control circuit is provided to automatically provide the higher or lower pressure as the transmission operating conditions require.

The present invention also contemplates the provision of a hydro-kinetic torque converter between the vehicle prime mover and the transmission input shaft to multiply torque input to the transmission. The hydro-kinetic torque converter is utilized in combination with the lower speed ratios of the transmission but may be locked-up, or made inoperative, during operation in the higher speed ratios.

While a torque converter will be shown and described in conjunction with the present invention, a torque converter is not a necessary component of the present invention. The controlled pressure actuating circuit can function effectively without the torque converter to accomplish the objects of this invention.

The present invention also contemplates a control system for the transmission which, through controlled pressure to the various clutches, provides an actuating circuit that functions effectively without a fluid coupling or torque converter between the engine output shaft and the transmission input shaft.

The invention also contemplates an improved accumulator that provides desired pressure for the clutches to provide the necessary volume of fluid to a clutch when one clutch is disengaged and vented and a second clutch is engaged. The pressure characteristics of the accumulator provide an arrangement where the desired pressure is maintained on the clutch while the accumulator is recharged.

With the foregoing considerations in mind, it is a principal object of the present invention to provide a combination of an improved constant mesh transmission and a controlled pressure actuating circuit to effect shifting of the transmission from one speed ratio to another.

Another object of the present invention is to provide a transmission compact in structure having six speed ratios in one direction of operation and six speed ratios in the other direction of operation.

Another object of this invention is to provide a controlled pressure actuating circuit which is adapted to actuate hydraulic mechanisms at one of two maximum values of fluid pressure.

Another object of this invention is to provide a controlled pressure actuating circuit for a transmission having a plurality of hydraulically actuated clutches wherein the pressure of the fluid conducted to the clutches is adjusted according to the torque to be transmitted through the clutches.

Another object of this invention is to provide a transmission suitable for use with heavy duty shuttle type vehicles.

Another object of this invention is to provide a transmission control circuit that includes hydraulic return means to control the pressure of the actuating fluid to be transmitted to the transmission clutches.

A further object of this invention is to provide a transmission having a plurality of speeds in both directions that is easy to fabricate, assemble, install and maintain.

Another object of this invention is to provide a transmission having six speeds in each direction that has a minimum number of shafts, gears and clutches.

Another object of this invention is to provide a controlled pressure actuating circuit for a transmission wherein the pressure of the fluid conducted to certain of the clutches is maintained with predetermined pressure levels.

Another object of this invention is to provide a control system for a transmission that does not require a fluid coupling or torque converter between the engine output shaft and the transmission input shaft.

These and other objects of this invention will become apparent as the description of the invention proceeds in conjunction with the accompanying drawings.

In the drawings:

FIGURE 1 is an end elevational view of a preferred illustrative form of the improved transmission mechanism not showing the transmission control circuit.

FIGURE 2 is an end elevational view looking toward the opposite end of the transmission mechanism from that shown in FIGURE 1.

FIGURE 3 is a developed longitudinal section taken substantially on the planes of line 3—3 of FIGURE 2 illustrating the transmission gearing and the associated control clutches.

FIGURES 4, 5 and 6 are cross sectional views taken substantially along the lines 4—4, 5—5 and 6—6 respectively of FIGURE 3.

FIGURE 7 is a schematic drawing showing the transmission of FIGURES 1-6 with the controlled pressure actuating circuit installed thereon.

FIGURE 8 is a schematic drawing showing of another controlled pressure actuating circuit.

FIGURE 9 is a view in section of the accumulator schematically illustrated in FIGURE 8.

FIGURE 10 is a graphical representation of the cumulative effect of the springs in the accumulator.

In the drawings, like reference characters refer to similar elements of the invention throughout all figures of the drawings. To facilitate description of the invention, the improved transmission mechanism will first be described in detail without the controlled pressure actuating circuit installed thereon. This detailed description will refer particularly to FIGURES 1 through 6 of the drawings. The novel combination of the improved transmission and the controlled pressure actuating circuits will then be described in detail with particular reference to the schematic representation of FIGURES 7 and 8 of the drawings.

Referring to FIGURE 3, the improved transmission mechanism generally designated by the numeral 10 has a housing 12 which encloses the various countershafts and gears and contains a lubricant bath. The housing 12 has a pair of inner partitions or walls 14 and 16 which have apertures therethrough to support the countershafts therein, as will be later described. A prime mover, not shown in FIGURES 1-6, drives a propeller shaft 18 which is connected to an input shaft 20 by means of a universal connection 22. The prime mover employed is preferably unidirectional so that the input shaft 20 rotates in the same direction irrespective of the direction of rotation of the output shaft.

The input shaft 20 is journaled in the housing end wall and supported within by roller bearings 24 and rotatably carried by the roller bearings 24 in the partition 14. A spur gear 26 is keyed to the input shaft 20 and is rotatable therewith.

Three countershafts 28, 30 and 32 are journaled in the housing 12 in parallel spaced relation to each other and have their end portions extend outwardly beyond the side walls of the housing 12. The countershaft 28 has a pair of tubular shafts 34 and 36 coaxially positioned thereon in rotatable relation thereto. The tubular shafts 34 and 36 have end portions extending beyond the side walls of the housing 12. Similarly the countershaft 30 has a pair of tubular shafts 38 and 40 arranged coaxially thereon in rotatable relation thereto with end portions extending beyond the side walls of the housing 12. The countershaft 32 also has a pair of tubular shafts 42 and 44 coaxially secured thereon in rotatable relation thereto and with end portions extending beyond the side wall of the housing 12.

A fourth countershaft 46 is journaled in the side wall of the housing 12 and has its other end portion rotatably supported in bearings 24 in the housing partition 16. The other end portion of the countershaft 46 extends outwardly beyond the side wall of housing 12. A tubular shaft 48 is coaxially positioned on countershaft 46 in rotatable relation thereto and has an end portion extending outwardly beyond the side wall of housing 12. A forward directional gear 50 is keyed to and rotatable with the tubular shaft 34 which is coaxial with countershaft 28. The forward directional gear 50 is in meshing relation with spur gear 26 that is keyed to input shaft 20.

A reverse directional gear 52 is keyed to and rotatable with the tubular shaft 42 coaxially positioned on countershaft 32. Reverse directional gear 52 is in meshing relation with and driven by forward directional gear 50. A connecting gear 54 is keyed to and rotatable with tubular shaft 38 that is coaxially positioned on countershaft 30. The countershaft 28 has a connecting gear 56 keyed thereto and rotatable therewith. The connecting gear 56 is in meshing relation with connecting gear 54. Another connecting gear 58 is keyed to and rotatable with countershaft 32. The connecting gear 58 is also in meshing relation with connecting gear 54. With this arrangement if either countershaft 28 or countershaft 32 is rotating, the rotation is transmitted to the other of the countershafts by means of connecting gears 58, 54 and 56. It should be noted, due to the arrangement of gears 54, 56 and 58, that countershafts 28 and 32 will rotate in the same direction.

A change speed spur gear 60 is keyed to and rotatable with the tubular shaft 44 that is coaxially positioned on countershaft 32. The change speed spur gear 60 is in meshing relation with a spur gear 62 that is keyed to and rotatable with countershaft 30. Thus rotation of tubular shaft 44 is transmitted to countershaft 30 by means of the spur gears 60 and 62. Another change speed gear 64 is keyed to and rotatable with the tubular shaft 36 that is coaxially arranged on countershaft 28. The change speed spur gear is in meshing relation with a spur gear 66 that is keyed to and rotatable with countershaft 30. Thus rotation of tubular shaft 36 is transmitted to countershaft 30 through gears 64 and 66.

A spur gear 68 is keyed to and rotatable with countershaft 46. The spur gear 68 is in meshing relation with spur gear 66 as illustrated in FIGURE 5. Thus the rotation of countershaft 46 is transmitted to the countershaft 30 through meshing spur gears 68 and 66. The tubular shaft 48 coaxially positioned on countershaft 46 has a spur gear 70 keyed thereto and rotatable therewith. The spur gear 70 is in meshing relation with a spur gear 72 that is keyed to and rotatable with tubular shaft 40. Thus rotation of tubular shaft 48 is transmitted to tubular shaft 40 through meshing spur gears 70 and 72. The relation of countershafts 46 and 30, tubular shafts 48 and 40 and spur gears 70 and 72 is clearly illustrated in FIGURE 6.

A terminal gear 74 is keyed to and rotatable with output shaft 76. The output shaft 76 is rigidly connected to a housing 78 of a clutch, as will be later explained.

Arranged exteriorly of the housing 12 are the following clutches:

Directional clutches

80—Forward directional clutch which frictionally engages tubular shaft 34 to countershaft 28.
82—Reverse directional clutch which frictionally engages tubular shaft 42 to countershaft 32.

Speed range clutches

84—Low range clutch which engages tubular shaft 48 to countershaft 46.
86—High range clutch which engages tubular shaft 40 to countershaft 30.

Change speed clutches

88—High speed change speed clutch which is arranged to frictionally engage tubular shaft 38 to countershaft 30.
90—Intermediate speed change speed clutch which is arranged to engage tubular shaft 36 to countershaft 28.
92—Low speed change speed clutch which is arranged to frictionally engage tubular shaft 44 to countershaft 32.

The above clutches are all hydraulically operated, multi-disc type and are arranged exteriorly of the transmission housing for ready accessibility. For illustration the intermediate speed change speed clutch 90 is shown in section in FIGURE 3. Each clutch includes an inner member 94 keyed to the countershaft which in the sectional illustration is countershaft 28. The outer rotatable clutch casing 96 is secured to the tubular shaft which in this instance is tubular shaft 36. The inner member 94 and the casing 96 carry interleaved clutch discs or plates 98 which when pressed together serve to frictionally connect or engage the countershaft and the tubular shaft for rotation together. Piston 100 is received in a cylinder bore 102 formed within an end enclosure 104 of the outer rotatable clutch casing 96. The piston 100 has a clutch operating portion 106 which abuts the discs 98 and is adapted to move the discs into a clutch engaged position. The piston 100 is normally held in a retracted position by means of springs 108 which act on the bolt 110. The closure member 104 has an element 112 of a conventional fluid swivel 114 connected thereto and an outer element 116 of the swivel is coupled to a fluid conduit. The fluid conduit and swivel coupling 114 are arranged to supply fluid under pressure to the cylinder bore 102. When fluid under pressure is supplied to the cylinder bore 102 the fluid pressure moves the piston 100 until the clutch operating portion 106 moves the clutch discs 98 into frictional engagement. In the absence of fluid under pressure within the cylinder bore 102 the springs 108 retract the piston 100 and release the interleaved clutch discs 98. The above details of the clutch 90 are set forth for illustrative purposes only. It should be understood that other types of clutches could be used with equal facility and the specific clutch construction does not form a part of this invention.

The high range clutch 86 has an external clutch housing or casing 78 to which the output shaft 76 is secured. In this clutch the fluid under pressure is fed into the cylinder bore 102 by means of a conduit 118 which is arranged coaxially with the tubular portion 120 of output shaft 76. Again, this method of providing fluid under pressure to high range clutch 86 is disclosed by way of illustration.

OPERATION

The above described transmission 10 is capable of providing six speeds in the forward direction and six speeds in the reverse direction. The rotation of input shaft 20 is transmitted through spur gear 26 to directional gears 50 and 52. The directional clutches 80 and 82 transmit the rotation from the selected directional gear 50 or 52 to the countershafts 28 and 32. The change speed clutches 88, 90 and 92 selectively connect the rotating countershafts 28 or 32 to the respective tubular shafts 36, 38 or 44. Through a gearing arrangement in two instances and by means of a direct drive in the other instance, the rotation of countershafts 28 and 32 is transmitted by means of engagement of the selected change speed clutches to transmit the rotation of countershafts 28 and 32 to countershaft 30. The range clutches 84 and 86 selectively connect the respective tubular shafts 40 and 48 to the countershafts 30 and 56 to thereby drive the output shaft 76 in the selected speed range.

In each speed in either direction there are three clutches engaged, a directional clutch, a change speed clutch, and a range clutch. For example, in forward low range low speed the following clutches are engaged: forward directional clutch 80, low range clutch 84, and low speed clutch 92. In reverse high range intermediate speed for example, the following clutches are engaged: reverse directional clutch 82, intermediate speed change speed clutch 90 and high range clutch 86.

The operation of our transmission, the various clutches engaged and the various gearing steps in the selected direction, selected range and selected speed are as follows:

*Forward low range low speed*

Clutches engaged—80, 84 and 92.

Power from input shaft 20 is transmitted through spur gear 26 to forward directional gear 50. Spur gear 50 drives tubular shaft 34 which through engagement of forward directional clutch 80 drives countershaft 28. The rotation of countershaft 28 is transmitted through connecting gears 56 and 54 to spur gear 58. Spur gear 58 being keyed to countershaft 32 rotates the same. The rotation of countershaft 32 is transmitted to tubular shaft 44 through low speed clutch 92. Spur gear 60 which is keyed to tubular shaft 44 transmits rotation therefrom to countershaft 30 through its connection with spur gear 62. Rotation of countershaft 30 is transmitted to countershaft 46 through spur gears 66 and 68. Low range clutch 84 being engaged transmits motion from countershaft 46 to tubular shaft 48 which in turn transmits motion to tubular shaft 40 through spur gears 70 and 72. Tubular shaft 40 is connected to the clutch housing 78 which in turn is connected to output shaft 76 thereby transmitting rotative motion from tubular shaft 40 to output shaft 76 in forward low range low speed.

*Forward low range intermediate speed*

Clutches engaged—80, 84 and 90.

Power is transmitted through the following gears, shafts, and clutches: input shaft 20, spur gears 26 and 50, tubular shaft 34, clutch 80, countershaft 28, intermediate speed clutch 90, tubular shaft 36, spur gears 64, 66, 68 to countershaft 46; from countershaft 46 through low range clutch 84 to tubular shaft 48 and thence from tubular shaft 48 through spur gears 70 and 72 to tubular shaft 40, clutch housing 78 and output shaft 76 in forward low range intermediate speed.

*Forward low range high speed*

Clutches engaged—80, 84 and 88.

Power is transmitted through the following gears, shafts, and clutches: input shaft 20, spur gears 26 and 50, tubular shaft 34, forward directional clutch 80, countershaft 28, spur gears 56 and 54, tubular shaft 38, high speed clutch 88, countershaft 30, spur gears 66 and 68, countershaft 46. Low range clutch 84 engages countershaft 46 to tubular shaft 48 to transmit rotation thereto. Power is transmitted from tubular shaft 48 through spur gears 70 and 72 to tubular shaft 40 and thence to clutch housing 78 and output shaft 76 in forward low range high speed.

Forward high range low speed

Clutches engaged—80, 86 and 92.

Power is transmitted through the following gears, shafts and clutches: input shaft 20, spur gears 26 and 50, tubular shaft 34, forward directional clutch 80, countershaft 28, spur gears 56, 54 and 58, countershaft 32, low speed clutch 92, tubular shaft 44, spur gears 60 and 62, countershaft 30, high range clutch 86 through clutch housing 78 to output shaft 76 in forward high range low speed.

Forward high range intermediate speed

Clutches engaged—80, 86 and 90.

Power is transmitted as follows: input shaft 20, spur gears 26 and 50, tubular shaft 34, forward directional clutch 80, countershaft 28, intermediate speed clutch 90, tubular shaft 36, spur gears 64 and 66, countershaft 30, high range clutch 86 to clutch housing 78 and output shaft 76 in forward high range intermediate speed.

Forward high range high speed

Clutches engaged—80, 86 and 88.

Power is transmitted as follows: input shaft 20, spur gears 26 and 50, tubular shaft 34, forward directional clutch 80, countershaft 28, spur gears 56 and 54, tubular shaft 38, high speed clutch 88, countershaft 30, high range clutch 86 to clutch housing 78 and output shaft 76 in forward high range high speed.

Reverse low range low speed

Clutches engaged—82, 84 and 92.

Power is transmitted as follows: input shaft 20, spur gears 26, 50 and 52, tubular shaft 42, reverse directional clutch 82, countershaft 32, low speed clutch 92, tubular shaft 44, spur gears 60 and 62, countershaft 30, spur gears 66 and 68, countershaft 46, low range clutch 84, tubular shaft 48, spur gears 70 and 72, tubular shaft 40, clutch housing 78 and output shaft 76 in reverse low range low speed.

Reverse low range intermediate speed

Clutches engaged—82, 84 and 90.

Power is transmitted as follows: input shaft 20, spur gears 26, 50 and 52, tubular shaft 42, reverse directional clutch 82, countershaft 32, spur gears 58, 54 and 56, countershaft 28, intermediate speed clutch 90, tubular shaft 36, spur gears 64, 66 and 68, countershaft 46, low range clutch 84, tubular shaft 48, spur gears 70 and 72, tubular shaft 40, clutch housing 78, output shaft 76 in reverse low range intermediate speed.

Reverse low range high speed

Clutches engaged—82, 84 and 88.

Power is transmitted as follows: input shaft 20, spur gears 26, 50 and 52, tubular shaft 42, reverse directional clutch 82, countershaft 32, spur gears 58 and 54, tubular shaft 38, high speed clutch 88, countershaft 30, spur gears 66 and 68, countershaft 46, low range clutch 84, tubular shaft 48, spur gears 70 and 72, tubular shaft 40, clutch housing 78, output shaft 76 in reverse low range high speed.

Reverse high range low speed

Clutches engaged—82, 86 and 92.

Power is transmitted as follows: input shaft 20, spur gears 26, 50 and 52, tubular shaft 42, reverse directional clutch 82, countershaft 32, low speed clutch 92, tubular shaft 44, spur gears 60 and 62, countershaft 30, high range clutch 86, tubular shaft 40, clutch housing 78, output shaft 76 in reverse high range low speed.

Reverse high range intermediate speed

Clutches engaged—82, 86 and 90.

Power is transmitted as follows: input shaft 20, spur gears 26, 50 and 52, tubular shaft 42, reverse directional clutch 82, countershaft 32, spur gears 58, 54 and 56, countershaft 28, intermediate speed clutch 90, tubular shaft 36, spur gears 64 and 66, countershaft 30, high range clutch 86, tubular shaft 40 and clutch housing 78 to output shaft 76 in reverse high range intermediate speed.

Reverse high range high speed

Clutches engaged—82, 86 and 88.

Power is transmitted as follows: input shaft 20, spur gears 26, 50 and 52, tubular shaft 42, reverse directional clutch 82, countershaft 32, spur gears 58 and 54, tubular shaft 38, high speed clutch 88, countershaft 30, high range clutch 86, tubular shaft 40 and clutch housing 78 to output shaft 76 in reverse high range high speed.

With the above described arrangement power transmission includes two ranges of speeds in each direction. Each range includes three different speeds. Thus with our improved transmission, it is now possible to obtain a wider range of speed in both directions. To obtain these additional speeds in both directions a minimum number of shafts, gears and clutches are employed.

With the foregoing description of the improved transmission mechanism in mind, the combination of the improved transmission mechanism with the novel controlled pressure actuating circuit may be described in detail with particular reference to FIGURE 7 of the drawings. In FIGURE 7 the transmission 10 of FIGURES 1–6 is shown schematically. As described in connection with FIGURES 1–6, the transmission 10 has the input shaft 20, the output shaft 76, forward directional clutch 80, reverse directional clutch 82, low range clutch 84, high range clutch 86, high speed clutch 88, intermediate speed clutch 90, and low speed clutch 92. The showing of the transmission 10 in FIGURE 7 conforms to the developed longitudinal section of FIGURE 3 and the clutches and shafts shown in FIGURE 7 occupy the same relative positions in FIGURE 7 as they occupy in FIGURE 3.

Mechanically connected to the transmission input shaft 20 are a torque converter shown generally at 120, a positive displacement pump 122, and a prime mover 124 which drives the transmission input shaft 20 through the torque converter 120. The prime mover, in most instances, is unidirectional and the positive displacement pump 122 is also unidirectional. As shown in FIGURE 7, the positive displacement pump is connected in series with the torque converter 120 to drive the transmission input shaft 20. It will be understood that the positive displacement pump 122 need not be in series with the torque converter and the transmission input shaft but is merely required to be driven by the prime mover 124. Thus, the pump 122 could be geared to the prime mover or the torque converter and be driven thereby. The prime mover 124 can be any source of rotary power such as an internal combustion engine or an electric motor.

Mechanically connected to the transmission output shaft 76 is a reversible positive displacement pump 126 which is an auxiliary pump to supply pressurized fluid for a purpose to be described. Again, the mechanical connection between the transmission output shaft 76 and the pump 126 is to indicate that the pump is driven by the transmission output shaft and there may be reduction gearing between the output shaft and the pump.

The torque converter 120 is of conventional construction. It has an impeller member 128, which is nonrotatably secured to the torque converter input shaft 130. The torque converter turbine member 132 is designed to be driven by the impeller member 128 through the circulation of fluid in a closed toroidal circuit as is well known in the torque converter art. The torque converter has a stator member 134 which is secured to the torque converter fixed housing member 136 through a one-way or overriding clutch 138. As is also well known in the torque converter art, the one-way clutch 138 permits the stator member 134 to rotate freely relative to the fixed housing member 136, once the fluid velocities within the toroidal fluid circuit become such that the stator member no longer redirects fluid to multiply torque in the torque converter.

The torque converter impeller member 128 has an annular chamber 142 formed therein. An annular piston 144 is movably received within chamber 142. When fluid under pressure is admitted to annular chamber 142 it forces piston 144 into contact with the turbine member 132 thereby locking the impeller member 128 and the turbine member 132 together as a unit so that they may not rotate relative to each other. The piston 144 forms a converter lock-up unit which, when actuated, serves to lock the converter impeller 128 to the turbine member 132 thus rendering the torque converter inoperative to multiply torque. It will be appreciated that when the torque converter is in operation and the piston 144 is not engaged with the turbine member 132, the impeller 128 and the turbine member 132 rotate relative to each other and the differential in speed between them is a function of the torque multiplication through the torque converter.

The torque converter input shaft 130 is directly driven by the prime mover 124. The torque converter output shaft 140, which is nonrotatably secured to the converter turbine member 132, directly drives the transmission input shaft 20. As described in connection with FIGURES 1–6 of the drawings, the transmission 10 produces six speed ratios in each direction of its operation. With the torque converter interposed between the engine and the transmission, six additional speed ratios or torque multiples, are produced in each direction of transmission operation. Thus when the torque converter is locked-up by the engagement of piston 144 with turbine member 132, the torque converter impeller member 128 and turbine member 132 rotate as a unit and the shafts 130 and 140 of the torque converter rotate at the same angular velocities. In this instance, the transmission 10 has the speed ratios described previously in connection with FIGURES 1–6. When the torque converter is in operation, the piston 144 is withdrawn from the turbine member 132 and the converter impeller member 128 is driven by the prime mover 124. The turbine member 132 of the torque converter is driven through the toroidal fluid circuit by the kinetic energy of the fluid within the circuit circulated by impeller member 128. The circulation of the fluid multiplies the torque input to the impeller member 128 and transmits an increased torque to the turbine member 132 in well known fashion. The turbine member 132 rotates at an angular velocity less than the impeller member 128.

With the torque converter in operation, the input speed to the transmission 10 is less than the speed of the prime mover 124 and the torque input to the transmission 10 is greater than the torque produced by the prime mover 124. Thus, while the transmission speed ratios remain the same as in the previously described case, there are six additional torque multiples in each direction of transmission rotation since the torque converter acts upon the power input to the transmission input shaft 20. The significance of the varying torque through the torque converter in the overall transmission actuating circuit will become apparent as this description proceeds.

The engagement of the various speed ratios of the basic transmission 10 is accomplished by actuating the clutches of the transmission 10. These clutches are actuated by hydraulic fluid. A transmission programming valve 146 is provided to coordinate the actuation of the clutches of the transmission 10 and to engage the desired speed ratio of the transmission 10. The transmission programming valve 146 shown in FIGURE 7 is exemplary only, and its exact construction forms no part of the present invention.

In the present instance, the programming valve 146 has a plurality of fluid ports. The pressure inlet port 148 of valve 146 provides for the entry of operating pressure into the programming valve 146. The vent port 150 allows the fluid to be vented as will be described in detail at a later point in this specification. The programming valve 146 also has a forward directional point port 152, a reverse directional port 154, a high range port 156, a low range port 158, a high speed port 160, an intermediate speed port 162, and a low speed port 164.

The various ports of the transmission programming valve 146 are connected to the corresponding clutches of the transmission 10 through conduits. Thus, the forward directional conduit 166 connects port 152 with transmission clutch 80. The reverse directional conduit 168 connects port 154 with transmission clutch 82. The high range conduit 170 joins the port 156 and the transmission clutch 86. It will be noted that the high range conduit 170 has a branch line 208 which communicates with it. This branch line 208 will be described in detail at a later point in the specification.

The low range conduit 172 joins the programming valve port 158 and the transmission clutch 84. In a like manner the high speed conduit 174, the intermediate speed conduit 176, and the low speed conduit 178 are provided to join the corresponding programming valve ports to their respective clutches.

A vent conduit 180 is connected to the programming valve vent port 150 and communicates at its other end with a fluid reservoir 182 provided for the controlled pressure actuating circuit shown in FIGURE 7. Fluid reservoir 182 is shown schematically in FIGURE 7 and is the common return for the various hydraulic sub-circuits shown in FIGURE 7. In actual practice, the fluid reservoir 182 may be contained within the transmission housing 10 or may be a separate unit mounted on the vehicle. Reservoir 182 will be referred to throughout this specification as the various hydraulic sub-circuits are described.

A controlled pressure conduit 184 supplies fluid under pressure from the pressure control valve 186 to the programming valve pressure inlet port 148. While the exact construction of the programming valve 146 is not a critical point in the present invention, the function which it performs should be considered. During all periods when the vehicle prime mover is operating, fluid under pressure is provided to the transmission programming valve 146 through the control pressure conduit 184. When no speed ratio of the transmission is engaged, and the transmission is in a neutral position, the pressure from conduit 184 is vented to reservoir 182 through the vent port 150 and the vent conduit 180. Thus, the neutral position of the programming valve 146 vents the pressurized fluid back to the reservoir.

When the programming valve 146 is moved to a position corresponding to a specific transmission speed ratio, either manually or by some automatic control system as previously discussed, the vent port 150 is closed and the pressurized fluid admitted into pressure inlet port 148 is directed through the valve simultaneously to three valve outlet ports corresponding to the specific speed of the transmission desired. For example, if it is desired to operate the transmission 10 in the forward direction in low range and low speed, the fluid entering pressure inlet port 148 of valve 146 is directed by valve 146 to forward directional port 152, low range port 158, and low speed port 164 simultaneously. The pressurized fluid from conduit 184 is then directed through the valve 146 to the corresponding clutches 80, 84 and 92 of the transmission to operate the transmission at forward low range, low speed. In a like manner, the programming valve 146 can be positioned to simultaneously connect the proper conduits to engage the transmission 10 in any of the twelve speed ratios enumerated earlier in connection with the description of the basic transmission as shown in FIGURES 1–6.

The pressure control valve 186 provides the pressure control for the programming valve 146 and determines at what pressure the clutches will be actuated by the pressurized fluid passing through valve 146. The pressure control valve 186 has a pressure inlet port 188, a controlled pressure outlet port 190, an actuating port 192, and a dump port 194. The pressure control valve 186 is a suitable commercially available two pressure control valve. The valve is designed to produce two pressure levels through it. Its exact construction forms no part of the present invention and, as stated, it is a commercially available unit.

The control valve 186 receives fluid under pressure through its inlet port 188. This fluid under pressure may vary in pressure magnitude. When not actuated, the valve 186 serves to limit the pressure of the fluid transmitted through the control pressure outlet port 190 to conduit 184 which communicates with port 190. When not actuated, valve 186 limits the pressure in conduit 184 to a relatively high value which will be termed, for description purposes, the "high maximum" value. When the pressure control valve 186 is actuated, the magnitude of the pressure passed into conduit 184 is limited to a second value substantially less than the high maximum value. This second value will be termed the "low maximum" value and is approximately one-half the high maximum value.

When the valve 186 is in its unactuated condition, no fluid pressure is admitted to the actuating port 192. When fluid pressure is admitted to the actuating port 192, the valve becomes actuated and the value of the pressure in conduit 184 is reduced to the low maximum value. Dump port 194 is provided so that fluid at excessive pressures may be vented from valve 186 to maintain the pressure at either the high maximum value or the low maximum value as valve actuating conditions require.

A dump conduit 196 is provided to communicate with dump port 194 to return excess fluid to the fluid reservoir 182. An actuating conduit 198 communicates with the control valve actuating port 192 to provide actuating fluid pressure to the control valve 186 under certain operating conditions as will be described. At its other end, actuating conduit 198 communicates with a shuttle valve 200. The actuating conduit 198 communicates with the shuttle valve outlet port 202.

The shuttle valve 200 is of conventional construction. It has a first inlet port 204 and a second inlet port 206. A double ball-check valve is provided within the shuttle valve so that whichever of the inlet ports 204 or 206 receives fluid at the higher pressure will communicate with the outlet port 202. As shown in FIGURE 7, the shuttle valve inlet port 204 is receiving the higher pressure so that the ball-check valve is forced into a position which blocks the shuttle valve inlet port 206 and allows the inlet port 204 to communicate with the outlet port 202. The purpose of shuttle valve 200 will become apparent as this description proceeds.

A shuttle valve inlet conduit 208 communicates at one end with the shuttle valve second inlet port 206 and, at its other end, it communicates with the high range conduit 170 which joins the high range port 156 of the transmission programming valve 146 to the high range clutch 86 of transmission 10. A shuttle valve inlet conduit 210 communicates with the first shuttle valve inlet port 204.

Thus far the transmission programming valve 146 and its functions have been described in detail. The pressure control valve 186 which provides one of two maximum pressures to the transmission programming valve 146 has also been described in detail. The sources of pressure for the transmission actuating circuit will now be considered and their interrelation with the components already described will be discussed.

The primary source of fluid pressure for the controlled pressure actuating circuit is the positive displacement pump 122 which is driven by the vehicle prime mover. Communicating with the inlet of pump 122 is an inlet conduit 212 through which fluid is drawn by pump 122 from the fluid reservoir 182. A filter 214 is provided in conduit 212 to maintain the fluid in the actuating circuit as clean as possible.

Upon rotation of the prime mover 124, the positive displacement pump 122 pressurizes the fluid drawn through inlet conduit 212 and forces the pressurized fluid into pressure outlet conduit 216. Pressure outlet conduit 216 has three branches 216a, 216b and and 216c. Branches 216a and 216b communicate with a converter lock-up valve 218 for a purpose to be described. Branch 216c of conduit 216 communicates with the pressure inlet port 188 of pressure control valve 186.

The pressure produced in conduit 216 by pump 122 is a function of the prime mover speed. When the prime mover rotates at maximum speed, the pressure in conduit 216 and therefore in conduit branch 216c which communicates with the pressure control valve 186, is approximately the high maximum value permitted in conduit 184 by control valve 186. At slower speeds of the prime mover 124, the pressure in conduit 216 is correspondingly less than the high maximum value permitted through valve 186.

The converter lock-up valve 218 has pressure inlet ports 220 and 222 which receive pressurized fluid from branches 216a and 216b of conduit 216 respectively. The valve 218 also has a pressure outlet port 224, a vent port 226, and an outlet port 228. As shown in FIGURE 7, the converter lock-up valve 218 is a rotary plug valve which has a plug 230. The exact construction of valve 218 forms no part of the present invention and the construction shown and described is by way of example only.

A converter make-up fluid conduit 232 communicates with the valve outlet port 224 and, under certain conditions of operation, conducts pressurized fluid to the torque converter 120 to maintain a specified amount of fluid in the toroidal circuit of the torque converter 120 and to aid in cooling the torque converter 120. A converter outlet conduit 234 returns the fluid displaced from the torque converter toroidal circuit to the fluid reservoir 182. Conduit 234 conducts the return fluid through a heat exchanger 236 and a relief valve 238 before permitting it to enter the reservoir 182.

Providing make-up fluid to an operating torque converter to facilitate cooling of the converter, and to prevent cavitation within the toroidal fluid circuit is well known in the torque converter field. The inlet connections from conduit 232 to the torque converter and the outlet connections to conduit 234 from the torque converter are conventional in all respects and form no part of the present invention. The relief valve 238 provides a minimum back pressure in conduit 234 so that the toroidal circuit of the torque converter always has a minimum fluid pressure. The heat exchanger 236 facilitates cooling of the heated liquid from the torque converter toroidal fluid circuit before that liquid is returned to the fluid reservoir 182.

The converter lock-up valve 218 has a vent conduit 240 communicating with the valve vent port 226. Vent conduit 240 returns fluid to the reservoir 182 under certain conditions of operation as will be described.

The converter lock-up conduit 242 communicates with the valve outlet port 228 and conducts pressurized fluid to the annular chamber 142 in the torque converter. Converter lock-up conduit 242 also communicates with the shuttle valve inlet conduit 210 for a purpose to be described.

The valve plug 230 of the converter lock-up valve 218 has two operating positions. In the operating position shown in full lines in FIGURE 7, the valve plug blocks the pressure inlet port 220 to the valve 218. It allows communication of pressurized fluid from conduit branch 216b with the converter make-up fluid conduit 232 so that fluid is circulated through the converter 120. In the position indicated in FIGURE 7, the valve plug 230 also allows communication of the converter lock-up conduit 242 with the vent conduit 240 so that the annular chamber 142 of the torque converter lock-up unit is vented to the fluid reservoir 182. This releases the torque converter lock-up unit and permits rotation of the torque converter impeller member 128 relative to the torque converter turbine member 132. The full line position of plug 230 represents the torque converter operating position of valve 218.

The alternate position of plug 230 indicated by the dotted lines 230' in FIGURE 7 is the torque converter lock-up position of the converter lock-up valve 218. In the dotted line position the pressure inlet branch 216a communicates with the converter lock-up conduit 242 so that pressure is admitted to the chamber 142 to engage the converter lock-up unit. When pressure is admitted to chamber 142, as described, the torque converter impeller member 128 and the torque converter turbine member 132 are locked together and they rotate as a unit. In the dotted line position of the valve 218, all other conduits communicating with valve 218 are made inoperative so that pressure conduit branch 216b is blocked, no pressurized fluid passes into converter make-up fluid conduit 232, and vent conduit 240 is blocked.

An alternate source of fluid pressure for the transmission programming valve 146 is provided by the reversible positive displacement pump 126 drivingly connected to the transmission output shaft 76. Since the pump 126 is connected to the transmission output shaft, it is operative during all periods that the vehicle is in motion. Accordingly, if the vehicle were in motion and the prime mover should fail, the pump 126 would provide pressure to actuate the clutches of the transmission 10. Since the pump 126 is drivingly connected to the transmission output shaft, it must be reversible because the transmission output shaft is reversible in direction.

The pump 126 is provided with fluid through either one of two pump conduits 244 or 246. Pump conduits 244 and 246 are each either the pump inlet or pump outlet conduits depending upon the direction of pump operation. Conduits 244 and 246 are each in communication with one of a pair of parallel conduits 248 and 250 respectively. Parallel conduit 248 has check valves 252 and 254 disposed on either side of its juncture with pump conduit 244. In a like manner, parallel conduit 250 has check valves 256 and 258 disposed on either side of its juncture with pump conduit 246.

The parallel conduits 248 and 250 come together to form an inlet conduit 260 which communicates with the fluid in the fluid reservoir 182. A filter 262 is provided in inlet conduit 250 to maintain fluid in the actuating circuit as clean as possible.

At their other ends, parallel conduits 248 and 250 join to form pressure conduit 264. Conduit 264 communicates with the control pressure conduit 184 to provide pressure to the pressure inlet port 148 of programming valve 146. Pressure conduit 264 also communicates with a vent conduit 266 which contains a pressure relief valve 270 and which communicates with vent conduit 180. The pressure relief valve 270 maintains the pressure in conduit 264 at a predetermined maximum. When the pressure in conduit 264 exceeds the predetermined maximum, fluid is vented through conduit 266 and relief valve 270 back to the fluid reservoir 182.

The conduit 264 also contains a check valve 272 to prevent reverse flow of fluid through conduit 264 from conduit 184.

The reversible pump 126 rotates with the transmission output shaft. Depending on its direction of rotation, one of the pump conduits 244 and 246 will become the suction conduit to the pump and the other will become the pressure outlet from the pump. For purposes of description, assume the pump 126 to be operating in a direction which makes pump conduit 246 the suction conduit and pump conduit 244 the pressure conduit. In such an event, fluid will be drawn through conduit 260 and check valve 258 into the pump 126. The fluid will be pressurized and passed into pump conduit 244. Pressurized fluid in pump conduit 244 will flow through check valve 252 into the pressure conduit 264. The check valve 254 in parallel conduit 248 will prevent pressurized fluid from being returned to reservoir 182. The check valve 256 in parallel conduit 250 will prevent pressurized fluid passing through check valve 252 from being pumped in a short circuit back to the pump suction inlet 246. The pressurized fluid in conduit 264 will be conducted through the check valve 272 into the conduit 184 and thence to the programming valve 146. If the pressure in conduit 264 exceeds a predetermined maximum, the excess pressure will be vented through conduit 266, relief valve 270 and vent conduit 180 back to the fluid reservoir 182.

If the pump 126 should be reversed in direction, the pump conduit 244 will become the suction inlet and the pump conduit 246 will become the pump pressure outlet and the circuit will function in a manner similar to that just described.

With the foregoing construction and arrangement of the components of the control pressure actuating circuit in mind, the operation of the control pressure actuating circuit can be considered. As has already been shown, the basic transmission 10 has two speed ranges in each direction of operation and three speed ratios in each speed range. As has also been discussed, the torque converter has a locked-up or inoperative condition of operation and an operative or torque multiplying condition.

For simplicity of description only the forward conditions and speed ratios of the transmission will be considered in detail. The reverse conditions and speed ratios of the transmission are analogous in all respects and will follow the forward conditions considered in detail. The transmission 10 has, in the forward direction, a high speed range and a low speed range. The torque converter can be operative to convert torque in both the high speed range of the transmission and in the low speed range. The torque converter can be locked-up in both the high speed range of the transmission and in the low speed range. It will be seen that there are four combinations of possibilities for torque multiplication through the transmission 10 and the torque converter 120. To facilitate description of the conditions and for future reference to these operating conditions, the condition wherein the transmission is operating in its high range and the torque converter is operative to convert torque will be termed "converter high." The condition where the transmission is in its low speed range and the converter is operative to convert torque will be termed "converter low." The condition wherein the transmission is in its high speed range and the torque converter is locked-up and not operative to convert torque will be termed "lock-up high." The condition with the transmission in the low speed range and the torque converter locked-up will be termed "lock-up low."

In studies of the torque transmitted by the various transmission clutches, it was determined that the torque transmitted through the clutches of the transmission in "converter low" required a fluid pressure which was relatively high to maintain the clutches of the transmission in engagement. This is so because the torque converter increased the input torque to the transmission and the torque transmitted through the transmission was relatively high. In the three other operating conditions of the transmission—"converter high," "lock-up low," and "lock-up high"—the torque transmitted through the clutches of the transmission 10 indicated that a lower fluid pressure could be utilized in both actuating the clutches and maintaining the clutches engaged. As previously discussed, with reduced fluid pressures the shock loads are also reduced, thus providing a smoother shifting operation between the various ratios.

The "high maximum" pressure permitted by the control valve 186 is adequate to maintain the clutches engaged while the transmission operates in "converter low." The "low maximum" pressure permitted through the control valve 186 is adequate to maintain the clutches of the transmission engaged in the other three conditions of operation.

The control circuit of FIGURE 7 provides a system whereby the compatible fluid pressure is conducted to the programming valve 146 from the control valve 186 to actuate the clutches of the transmission in their various speed ratios. To best describe the operation of the circuit, the four individual transmission operating conditions will be considered separately.

When the transmission operating condition is "converter low," the prime mover is operating, and the transmission programming valve 146 is positioned in any of the speeds in the low range, the following operating conditions exist. The plug 230 of the converter lock-up valve 218 is positioned in a full line position shown in FIGURE 7 to permit the converter to operate. This causes fluid under pressure to be conducted from pump 122 through conduits 216b and 232 into the torque converter 120 and back to the fluid reservoir 182 through conduit 234. This sub-circuit provides make-up fluid for the operating torque converter. The chamber 142 of the torque converter lock-up unit is vented to the fluid reservoir 182 through conduit 242, valve 218, and conduit 240. The shuttle valve inlet conduit 210 which communicates with conduit 242 is also vented to the fluid reservoir 182 via the same route.

Pressure from pump 122 is also conducted through conduit 216 and branch 216c to the pressure control valve 186. With the prime mover rotating at relatively high speed, the pressure in conduit 216 will be near the "high maximum" of pressure which may pass through valve 186.

With the transmission 10 in a low range speed—for illustration, consider it in low range, low speed—the pressure in conduit 184 will be transmitted through valve 146 to the clutches 80, 84 and 92 of the transmission. The remaining clutches of the transmission will be vented to the fluid reservoir 182 via their respective conduits to valve 146, and the vent conduit 180 from valve 146 to the fluid reservoir. With the remaining clutches, including clutch 86, vented to the reservoir, conduit 170 which is the high range conduit, will also be vented to the fluid reservoir. With conduit 170 so vented, conduit 208, which is the inlet conduit to shuttle valve 200, will also be vented to the reservoir since it communicates with the conduit 170. Since inlet conduits 208 and 210 to the shuttle valve 200 are both vented to the reservoir, there will be no actuating fluid pressure in actuating conduit 198 to pressure control valve 186. Accordingly, the pressure control valve 186 will be in its unactuated position. With the pressure control valve 186 in its unactuated position, pressure passing into conduit 184 may have pressure magnitudes anywhere up to the "high maximum" permitted by valve 186. Accordingly, the clutches of the transmission in "converter low" will be actuated with a relatively high fluid pressure so that they may transmit the high torque through the transmission.

In the "converter high" condition of transmission operation, the converter lock-up valve 218 will still be in its full line position as shown in FIGURE 7. Accordingly, fluid will be circulated through the torque converter 120, and the shuttle valve inlet conduit 210 will be vented to the fluid reservoir. The transmission 10 wil be engaged in a high range speed ratio—for illustration, consider the high range, low speed ratio—so that fluid under pressure from conduit 184 will be conducted through the programmng valve 146 to clutches 80, 86 and 92 through the conduits 166, 170 and 178 respectively. Since the high range conduit 170 will be subjected to fluid under pressure, the shuttle valve inlet conduit 208 will also be subjected to fluid under pressure. The pressurized fluid in conduit 208 wil enter shuttle valve 200 and be conducted to actuating conduit 198, but shuttle valve inlet port 204 will be blocked so that no pressurized fluid may pass from conduit 208 into conduit 210. With pressurized fluid in actuating conduit 198, the control valve 186 wil be actuated. When control valve 186 is actuated, it permits fluid under pressure to flow into conduit 184 only at pressure values up to the "low maximum" value permitted by the valve 186. Excess fluid pressure is vented from valve 186 through the pump conduit 196 to the fluid reservoir 182. Thus, in the "converter high" condition of transmission operation, the clutches of the transmission will be engaged with a relatively low fluid pressure compatible with the torque they are to transmit.

In the "lock-up low" condition of transmission operation, the plug 230 of the converter lock-up valve 218 will be in the dotted line position 230' of FIGURE 7. In that position, pressurized fluid from pump 122 will be conducted to the annular chamber 142 of the torque converter lock-up unit through conduit branch 216a and lock-up conduit 242 to lock up the torque converter and render it inoperative to multiply torque. With fluid under pressure in conduit 242, fluid under pressure will also be communicated into conduit 210. Fluid under pressure in conduit 210 will actuate the control valve 186 so that the fluid in conduit 184 can only be at a "low maximum" pressure value. Thus, in the "lock-up low" condition of operation, the transmission clutches will be actuated with a fluid pressure compatible with the relatively low torque to be transmitted through the transmission clutches.

In the "lock-up high" condition of transmission operation, the converter lock-up valve 218 will also be in the dotted line position 230' shown in FIGURE 7. Again, fluid under pressure wil be conducted through conduit 210 to the shuttle valve 200. With the transmission in a high range speed ratio, however, the clutch 86 and therefore the conduit 170 will be subject to fluid under pressure. Accordingly, the shuttle valve inlet conduit 208 which communicates with the high speed conduit 170 will also be subjected to fluid under pressure. Both shuttle valve inlet conduits 208 and 210 will have pressurized fluid conducted to them. Whichever of the fluid pressures—that in conduit 208 or that in conduit 210—is higher will overcome the ball check valve of the shuttle valve 200 and provide fluid to the actuating conduit 198. Thus, the control valve 186 will be actuated and the value of the pressure in conduit 184 will be at a "low maximum." In the "lock-up high" condition of transmission operation, the pressure which actuates the clutches of the transmission will be compatible with the torque to be transmitted by the clutches.

The fluid pressure supplied by the reversible positive displacement pump 126 is an emergency pressure only. The pressure relief valve 270 in conduit 266 is set so that the pressure in line 264 is below the "low maximum" pressure value permitted in conduit 184. Accordingly, so long as the positive displacement pump 122 is operating, there is no requirement for the pressure produced by pump 126. If, however, there should be a malfunctioning of pump 122, or if the prime mover should stop operating, the pump 126 is provided to conduct fluid directly to the transmission programming valve 146 so that the transmission clutches will be actuated. It will be appreciated that any pressurized fluid provided by pump 126 is not controlled by the pressure control valve 186 and therefore is not, as such, provided at a controlled pressure.

The controlled pressure actuating circuit of the present invention has been described as it applies to a constant mesh transmission, described in detail in FIGURES 1–6, driven through a torque converter by a prime mover. As stated previously, the torque converter is not a necessary component of the present invention. The torque converter combination illustrates the present invention in one of its forms. The torque converter 120 and the converter lock-up valve 218 could be excluded from the circuit described in order to provide a control pressure actuating system for the transmission alone. The shuttle valve 200 would also become unnecessary in this instance. To illustrate, consider that the torque transfer through the transmission due to the proportions of the transmission were such that in the high speed range only the "low maximum" value of fluid pressure was required to efficiently actuate the clutches of the transmission, while in the low speed range the "high maximum" value of fluid pressure was required to efficiently operate the transmission clutches. In such an instance, the conduit 170 could be connected directly to the actuating conduit 198 of the control valve so that when the high range clutch was actuated, the control valve would be actuated to provide the "low maximum" pressure into conduit 184.

In some instances, it may even be desirable to adjust the pressure required to actuate the individual speed change clutches of a transmission. In such instances, without the torque converter, the proper individual clutch actuating conduits can be connected through one-way check valves to the actuating conduit 198 for the control valve 186. Thus, whenever the clutches having conduits so connected were actuated, the control valve 186 would be actuated to produce a lower pressure to the programming valve 146.

Control system—FIGURE 8

In FIGURE 8 another novel controlled pressure actuating circuit is schematically illustrated. The transmission 310 schematically illustrated in FIGURE 8 has 12 speeds in one direction and 4 speeds in the other direction. The transmission 310 has many of the features of the transmission illustrated in FIGURES 1–6 in that all gears are in constant mesh and the pressure actuated clutches are positioned externally of the transmission housing. The detailed construction of the transmission 310 may be found in U.S. Patent 3,064,488 entitled "Constant Mesh Transmission" issued November 20, 1962 to Arthur L. Lee and Arthur B. Coval and assigned to the present assignee. The structure of the transmission does not form a part of this invention and is intended to be exemplary only and it will be apparent that the control system schematically illustrated in FIGURE 8 can be used with equal facility on other types of fluid pressure actuated transmissions.

The transmission 310 has four speed clutches 312, 314, 316, and 318. All of the speed clutches are arranged on one end of the transmission 310. The other end of transmission 310 has three range clutches, a low range clutch 320, medium range clutch 322, and a high range clutch 324. The transmission 310 also has a reverse clutch 326. The clutches 312–326 are fluid pressure actuated and are similar to the clutches illustrated in FIGURE 3.

The input shaft to the transmission 310 is not illustrated nor is the prime mover that actuates the transmission shown. It should be understood, however, that the input means to the transmission from a conventional prime mover may be attached to the exterior housing of the range clutches as is described in U.S. Patent 3,064,488. The control system includes a pump 328 which is a positive displacement pump and is suitably connected to the prime mover. The pump 328 is similar to the pump 122 illustrated in FIGURE 7.

The driven train of the transmission, that is, the transmission output shaft and the driving connections to the wheels, are suitably connected to a second positive displacement pump 330 which is an auxiliary pump that supplies pressurized fluid for a purpose similar to the pump 126 illustrated in FIGURE 7.

The engagement of the various speed ratios of the transmission 310 is accomplished by actuating the clutches of the transmission 310 by supplying pressurized fluid to the various clutches through the conduits illustrated in FIGURE 8.

The control system has two features which will be sequentially described. The first feature is the three pressure system for the speed clutches 312–318 and for the respective range and reverse clutches 320–326. The other feature is the modulation of pressure to preselected clutches by means of a pressure modulating valve and an accelerating cylinder. There is also included in the control system illustrated in FIGURE 8 an accumulator which supplies fluid to the various clutches at a predetermined rate of flow and pressure to provide smooth engagement of the clutches.

The control circuit in FIGURE 8 includes a pilot operated selector valve 332 which is arranged to actuate programming valves 334 and 336. Programming valve 334 provides pressurized fluid to the range and reverse clutches 320–326 and programming valve 336 provides pressurized fluid to the change speed clutches 312–318. The speed selector valve 332 has a fluid inlet P and a fluid outlet O. The outlet O bypasses fluid through valve 332 to the tank or reservoir. There are four speed outlet ports A, B, C and D which are arranged to provide fluid at pilot pressure to the programming valve 336 as a signal for programming valve 336 to engage the respective speed clutches 312–316. Pilot conduits 338, 340, 342 and 344 connect the outlet ports A, B and C to preselected inlet ports on programming valve 336. Conduits 346, 348, 350 and 352 connect programming valve 336 to the respective speed clutches 312–316. High pressure fluid is supplied to programming valve 336 through conduit 354. Thus the flow of pressurized fluid from conduit 354 to the respective conduits 346–350 is controlled by programming valve 336. The selection of the conduit through which the pressurized fluid will be transmitted to the respective speed clutch 312–318 is determined by selector valve 332. For example, if first speed is desired, selector valve 332 is actuated so that Port A is open and a signal by means of pressurized fluid is conducted through conduit 338 to the programming valve 336. The signal actuates programming valve 336 so that internal ports within programming valve 336 are opened to connect conduit 354 with conduit 346. In a similar manner, by actuating selector valve 332 signals can be transmitted through conduits 340–344 to programming valve 336 to connect conduit 354 to the selected conduit 348–350 to engage the speed clutch determined by the selector valve 332. Similarly the programming valve 334 is connected to the selector valve 332 by four pilot conduits 356–362. Conduit 356 connects low range outlet port in selector valve 332 with programming valve 334 and conduit 358 connects medium range outlet port M with programming valve 334. Conduit 360 connects high range outlet port H with programming valve 334 and conduit 362 connects reverse outlet port R with programming valve 334.

The programming valve 334 is connected by conduits 364–370 to range clutches 320–324 and reverse clutch 326. A supply of pressurized fluid is provided for programming valve 334 through conduit 372. With this arrangement when it is desired to engage low range clutch, port L in selector valve 332 is opened to send a pilot signal through conduit 356 to programming valve 334. The signal through conduit 356 actuates programming valve 334 to connect conduit 372 with conduit 364 to thereby provide pressurized fluid for low range clutch 320. In a similar manner by selecting the desired range in selector valve 332, an appropriate signal will be transmitted through the respective conduits 358–362 to programming valve 334 to connect the conduit 372 with the preselected conduits leading to the various range clutches. The selector valve 332 is so constructed that only one range clutch and one speed clutch may be engaged at one time.

The transmission control circuit illustrated in FIGURE 8 includes a sequence valve 374 which is connected by means of conduits 376 and 378 to pumps 328 and 330. The sequence valve 374 is arranged to supply hydraulic fluid at three pressures, for example 100 p.s.i., 200 p.s.i., and 450 p.s.i., to conduits 354 and 372. A conduit 380 connects the outlet of sequence valve 374 to a pressure modulating valve 382. The sequence valve is constructed to normally provide fluid at a pressure of about 100 p.s.i.

to outlet conduit 380. The sequence valve 374 has an internal pressure control device which is externally actuated to increase the outlet pressure of the fluid from 100 p.s.i. to either 200 p.s.i. or 450 p.s.i. The fluid in conduct 380 is conducted through modulating valve 382 to accumulator 384 by conduit 386. The pressurized fluid is conducted from accumulator 384 through conduit 388 to an accelerating cylinder 390. From accelerating cylinder 390 fluid under substantially the same pressure is conducted through conduits 354 and 372 to programming valves 336 and 334. For the present description of the control system, the function of the pressure modulating valve 382, accumulator 384 and accelerating cylinder 390 will not be described. A conduit from the outlet of sequence valve 374 to conduits 354 and 372 would provide the three pressure control system for the clutches of transmission 310. The sequence valve 374 has another outlet conduit 392 which provides pressurized fluid to the transmission 310 as a lubricant therefor. The sequence valve 374 has another outlet conduit 394 connected to a tank or reservoir 396.

It has been found highly desirable to provide three pressures for the various range and speed clutches depending upon the range desired. For example, in low range the clutches are subjected to a high torque and a high fluid pressure is required to prevent slippage of the clutch plates. A pressure of 450 p.s.i. on the low range clutch and on the speed clutches in low range has been found adequate to prevent slippage under the high torque conditions. In medium range, however, it was found that less pressure was required to maintain both the speed and the range clutches engaged. A pressure of 200 p.s.i. was found satisfactory. In high range less pressure was required to maintain the clutch plates engaged and a pressure of about 100 p.s.i. was found suitable. It is desirable from a wear standpoint and smooth transmission operation that a minimum pressure be exerted on the clutches. The control system illustrated in FIGURE 8 includes a means for automatically controlling the pressures in the clutches.

The programming valve 334 has an internal connection or passageways between conduit 356 and conduit 398. The conduit 398 is connected to the sequence valve 374. The programming valve 334 has other internal passageways which connect conduit 358 with conduit 400. Conduit 400 is also connected to the sequence valve 374. It should be understood that although the conduit 356 is connected to the conduit 398 through programming valve 334 other suitable arrangements could be provided for subjecting the sequence valve 374 to a predetermined pressure when the selector valve 332 opens low range port L.

The transmission control system illustrated in FIGURE 8 functions as follows to provide a three pressure system for the clutches of the transmission. Assume the selector valve 332 has port D (fourth speed) and port H (high range) open. Signals are transmitted through conduits 344 and 360 to programming valves 336 and 334 to connect respective conduits 354 and 372 to four speed conduit 352 and high range conduit 368. In this manner the high range clutch 354 is engaged and fourth speed clutch 318 is engaged and the transmission is engaged in the highest range and highest speed. As previously stated, sequence valve 374 provides pressure to conduit 380 and conduits 354 and 372 at 100 p.s.i. so that pressure at 100 p.s.i. is transmitted through conduits 354 and 372 to conduits 352 and 368 to engage high range clutch 324 and fourth speed clutch 318 with a pressure of approximately 100 p.s.i. As long as the selector valve 332 maintains high range port H open, the various speed clutches 312–318 when engaged will be subjected to a pressure of 100 p.s.i.

When the transmission 310 is down-shifted to medium range the port H in selector valve 332 is closed and port M is opened. A signal through conduit 358 is transmitted to conduit 400 from programming valve 334 to sequence valve 374. A pressure controller within valve 374 is actuated to increase the outlet pressure from valve 374 to conduit 380 from 100 p.s.i. to 200 p.s.i. The fluid pressure in conduits 354 and 372 is then increased to 200 p.s.i. Since conduit 372 is connected through programming valve 334 to medium range clutch 322 by conduit 366 the pressure exerted on medium range clutch 322 is 200 p.s.i. The same pressure transmitted through conduit 372 is transmitted through conduit 354 to programming valve 336. Thus any of the speed clutches 312–318 engaged while the medium range clutch 322 is engaged will be engaged at a pressure of 200 p.s.i.

When it is desired to down-shift the transmission into low range, a higher fluid pressure is required to maintain the low range clutch and the speed clutches engaged. To engage low range clutch 320 pressure port M is closed and pressure port L is opened in selector valve 332. A signal is transmitted through conduit 356 to programming valve 334 and simultaneously transmitted from programming valve 334 through conduit 398 to the sequence valve 374. The signal received by sequence valve 374 through conduit 398 actuates a second pressure controller within valve 374 to increase the fluid pressure from the outlet of sequence valve 374 to 450 p.s.i. The actuating pressure at 450 p.s.i. is conducted from selector valve 374 through conduit 380 to conduits 354 and 372. The programming valve 334 connects conduit 372 with low range conduit 364 to provide fluid under a pressure of 450 p.s.i. for low range clutch 320. Similarly, any speed clutch 312–318 when engaged is subjected to a pressure of 450 p.s.i. when the low range clutch is engaged.

In reverse, the clutches of transmission 310 require a higher pressure. Therefore, the programming valve 334 is so arranged that a signal transmitted through conduit 362 to programming valve 334 is simultaneously transmitted from programming valve 334 through conduit 398 to sequence valve 374 to provide a pressure of 450 p.s.i. for the reverse clutch 326 and the speed clutches 312–318 in a manner similar to that for low range forward operation.

From the above description it is apparent that it is now possible to provide a plurality of pressures for the respective clutches depending upon the range clutch that is engaged. The pilot conduits 398 and 400 provide a signal for the sequence valve 374 to regulate the pressure in the conduits supplying fluid to the various clutches.

*Circuit for manually controlling clutch pressure*

The control system illustrated in FIGURE 8 provides a circuit for disengaging the transmission 310 from the prime mover and engaging the preselected clutches in a manner that the vehicle will start from rest in a smooth manner similar to the modulated engagement of large friction clutches. The circuit includes a master cylinder 402 having an operator actuated pedal 404. The pedal 404 moves a plunger 406 to pressurize the fluid in conduit 408. In the drawing, six positions of the pedal 404 are illustrated and identified as positions A′ through F′. When it is desired to disconnect the transmission from the prime mover, the pedal 404 is depressed by the operator to position A′.

The control circuit includes pressure modulating valve 382 which has suitable internal porting and spool type valve actuating members to provide the hereinafter described functions. Any modulating valve capable of performing the hereinafter related functions is suitable for the transmission circuit diagrammatically illustrated in FIGURE 8. The pressure modulating valve 382 has an outlet port 410 to which is connected conduit 386. The pressure modulating valve 382 has another outlet port 412 to which a conduit 414 is connected. The pressure modulating valve 382 has an inlet port 416 to which conduit 380 is connected. Conduit 380 is arranged to supply pressurized fluid from sequence valve 374 to the pressure modulating valve 382 at the preselected pressure of 100, 200, or 450 p.s.i., as previously described. The pressure modulating valve 382 has another port 418 to which conduit 420 is connected. The sequence valve 374 is arranged to supply fluid at a pressure of about 20 p.s.i. to the conduit 420. When the internal porting and valving of pressure modulating valve 382 provides a connection for port 418 with other ports, as later described, and conduit 420 is subjected to a fluid pressure in excess of 20 p.s.i., the flow of fluid through conduit 420 is from pressure modulating valve 382 to sequence valve 374. Where, however, the port 418 is connected to a port having fluid at a pressure less than 20 p.s.i., the flow of fluid is from sequence valve 374 to pressure modulating valve 382. Port 422 is also provided in pressure modulating valve 382 and conduit 424 connects port 422 with the tank or reservoir 396. An accelerating cylinder 390 is included in the circuit illustrated in FIGURE 8 adjacent to the pressure modulating valve 382. The accelerating cylinder has a pair of outlet ports 426 and 428 connected to conduits 354 and 372 which supply the pressurized fluid to the programming valves 334 and 336. The accelerating cylinder 390 has an inlet port 430 connected to conduit 388 which conducts fluid under pressure from accumulator 384.

The accelerating cylinder 390 is illustrated partially in section to illustrate schematically the internal construction. The accelerating cylinder 390 has a piston 432 positioned within a cylindrical housing 434. The piston 432 is urged downwardly in the cylinder 434 by means of coil spring 436 against suitable stops. The inlet port 430 and outlet ports 426 and 428 communicate with the cylinder 434 and the cylinder 434 is normally filled with fluid by means of conduit 388. Conduit 414 connects modulating valve 382 with a cup shaped cylinder 438. When fluid under pressure is supplied to the cup shaped cylinder 438 through conduit 414 from modulating valve 382, as later described, the cup shaped cylinder 438 moves upwardly in the cylinder 434 against the force of spring 436 to move piston 432 upwardly and provide a volume of fluid to the clutches through conduits 354 and 372.

The manner in which the transmission 310 can be disengaged from the prime mover and the clutches engaged at a low pressure of about 20 p.s.i. for smooth engagement will now be described. When it is desired to disengage the transmission 310 from the prime mover, the pedal actuator 404 is depressed by the operator to position A'. This supplies fluid at a given pressure through conduit 408 to pressure modulating valve 382 to actuate internal spooling in the valve 382 to connect outlet ports 410 and 412 to outlet port 422 and vent the conduits 386 and 414 to tank 396. The venting of conduits 386 and 414 to tank relieves the fluid pressure on the clutches and disengages the previously engaged clutches. Assuming it is desired to start the transmission in low range first speed, clutches 320 and 312 are engaged by the selector valve 332. Although the programming valves 334 and 336 are deprived of fluid under pressure because the outlet port 410 in pressure modulating valve 382 is open to tank through port 422, the selector valve 332 is supplied with pressure through conduit 440. Fluid at a pressure of about 100 p.s.i. is supplied through conduit 440 to selector valve 332 and transmitted through the preselected ports in selector valve 332 to the pilot ports of programming valves 334 and 336. The pressure supplied to the programming valves 334 and 336 through the pilot conduits moves internal valving within the programming valves 334 and 336 to open internal porting between the respective conduits 354 and 372 and conduits 346 and 364 to first speed and low range clutches. Thus, although conduits 354 and 372 do not contain pressurized fluid, the porting within the programming valves 334 and 336 is properly selected by the pilot circuits to connect the respective conduits 334 and 372 to the preselected conduits of the clutches.

To supply pressurized fluid to the clutches 312 and 314, the operator releases a given pressure on pedal 404 and moves pedal 404 from position A' to position B'. The valving within pressure modulating valve 382 connects inlet port 416 to outlet port 412. This supplies fluid at a pressure of 450 p.s.i. through conduit 414 to cup shaped cylinder 338. The movement of pedal 404 from position A' to position B' internally connects pressure modulating valve inlet port 418 to outlet port 410 to simultaneously supply fluid to conduit 386 at approximately 20 p.s.i. pressure. Piston 432 within accelerating cylinder 390 moves upwardly under the pressure of fluid within cup shaped cylinder 438 to supply a predetermined quantity of fluid to the respective clutches 312 and 320. The piston 432 within accelerating cylinder 390 is of predetermined dimensions to limit the pressure of the fluid delivered from accelerating cylinder 390 to about 20 p.s.i. The principal purpose of accelerating cylinder 390 is to quickly supply a quantity of fluid to the clutches 312 and 320 to fill any voids therein. The accelerating cylinder 390, in a very short time, provides a supply of fluid for the clutches to engage the clutch plates and fill the cylinder within the clutches. The pressure of the fluid supplied by accelerating cylinder 390, however, is limited to a low pressure of about 20 p.s.i. It has been found that a pressure of about 20 p.s.i. on the clutches is sufficient to move a vehicle on level ground but not make the vehicle lurch.

The operator then releases pedal 404 so that it moves from position B' to position C' and thereby regulates pressure in conduit 408 to move a suitable spool within the modulating valve 382 to simultaneously close port 412 and open port 410. When the pedal 404 is in position C' inlet port 416 is connected to outlet port 410 but the spool is so constructed that the pressure of the fluid leaving port 410 through conduit 386 to accumulator 384 is modulated to supply fluid at a pressure slightly in excess of 20 p.s.i. when pedal 404 is in position C'.

The port 418 connecting conduit 420 to sequence valve 374 now serves as a bypass outlet port to provide fluid to conduit 420 and lube conduit 392 extending from sequence valve 374. With this arrangement the outlet port 410 is connected to port 418 when the pedal 404 is in position B' to supply fluid at 20 p.s.i. to conduit 386. Upon movement of pedal 404 from position B' to position C', outlet port 410 is then connected to inlet port 416 and the pressure of the fluid in conduit 386 is regulated by a suitable spool within the valve 382. In this manner between positions B' and C' the pressure modulating valve outlet part 410 is being supplied with fluid at a pressure of 20 p.s.i. to thereby maintain the pressure of 20 p.s.i. in conduits 354 and 372. The movement of pedal 404 from position C' through D', E', and F' moves the spool within the pressure modulating valve 386 to increase the pressure of the fluid leaving outlet port 410 from the 20 p.s.i. to 450 p.s.i. The pedal 404 and master cylinder 402 are so constructed that control over the fluid pressure up to 100 p.s.i. is accurately regulated. Above 100 p.s.i., however, the clutches 320 and 312 are locked in position and the movement of pedal 404 above 100 p.s.i. is relatively fast.

With the above described circuitry it is now possible to disengage a fluid actuated transmission from the prime mover, supply a predetermined amount of fluid rapidly to the clutches at a preselected reduced pressure to engage the clutches at this reduced pressure and thereafter to gradually increase the fluid pressure exerted on the clutches so that it is now possible to smoothly engage the transmission to the prime mover. It should be understood, depending upon the various clutch sizes and the like, the specific pressures used in the description can be altered without departing from the scope of the invention.

In FIGURE 8 the positions of the accelerating cylinder 390, accumulator 384 and pressure modulator valve 382 are schematically illustrated as spaced a substantial distance from the transmission 310. It should be understood that FIGURE 8 is simply a schematic representation and it is within the scope of the invention to position the various components immediately adjacent the transmission so that line or conduit effects are minimized.

Double spring accumulator

In FIGURE 8 there is included an accumulator 384 between pressure conduits 386 and 388. The details of the accumulator are illustrated in FIGURE 9, and FIGURE 10 is a graphical representation of the cumulative effect of the two springs within the accumulator. The accumulator 384 has a cylindrical body portion 444 with a cup shaped end portion 446. Positioned within the cylindrical body portion 444 is a cup shaped piston 448. Positioned in the open end of cylinder 444 is an end closure member 450 which serves as a lower stop for the piston 448 and is maintained in position by a snap ring 452 and an internal shoulder 454 in the cylinder inner wall. The closure member 450 has suitable O ring 456 which provides a fluid tight relation with the internal portion 444. The end closure member 450 has an inlet port 458 which is connected to conduit 386. The closure member 450 has internal coring and a metering valve 460 therein to regulate the flow of fluid under pressure from conduit 386 into the cylinder 444. The end closure 450 has an outlet port 462 which is connected to conduit 388 as illustrated in FIGURE 8 and internally connected within end closure 450 to inlet port 458.

Within the cylinder 444 there are a pair of springs 464 and 466. The spring 464 abuts at one end the end wall of cup shaped end portion 446 and at the other end the end wall of piston 448. Coaxially within the coil spring 464 there is second spring 466 of smaller diameter. One end of spring 466 abuts the end wall of cup shaped end portion 446 and its other end portion is spaced from the end wall of cup shaped piston 448, as clearly illustrated in FIGURE 9.

The piston 448 has a pair of piston ring seals 468 which minimize the flow of pressurized fluid around piston 448. The cup shaped end portion 446 has a suitable opening 470 which provides an outlet for any fluid collected within the cylinder 444 which has leaked around rings 468.

The accumulator 384 serves to increase both clutch plate life of the various clutches of transmission 310 and, in addition, provides soft clutch engagement and transition from one speed to another and from one range to another. The accumulator 384 prevents mechanical shock caused by a high fluid pressure being instantly exerted on the clutch plates when the clutches are engaged. The accumulator serves as a cushioning device which effects soft clutch engagement. The accumulator and the springs are so constructed that substantially the same constant volume of pressurized fluid is delivered by the accumulator to the clutches in all ratios and in all speeds.

The fluid actuated clutches have a piston cylinder arrangement with a return spring which empties the cylinder of its supply of fluid when the clutch is disengaged. To engage a clutch a given volume of fluid is required to move the piston within the clutch against the force of the spring a predetermined distance to bring the clutch plates into engagement. This volume of fluid will vary with the type of clutch used. For example, with a given type of clutch, 7 cubic inches of fluid are required to move the clutch actuating piston into engagement with the clutch plates before any actuating pressure is exerted on the clutch plates to engage the plates. After the cavity within the clutch housing has been filled and the piston has moved the clutch plates into engagement, the next drop of fluid supplied, if at a high pressure, is sufficient to lock the clutch plates into engagement. It is, therefore, highly desirable when engaging a fluid actuated clutch, to quickly provide the necessary fluid to fill the cavity within the clutch housing and bring the clutch plates into engagement. It is also desirable to minimize mechanical shock to engage the clutch plates at a reduced pressure and thereafter to increase the pressure on the clutch plates to prevent slippage therebetween.

The accumulator 384 is arranged to supply substantially the same volume to the clutches in all ratios. As previously discussed the transmission illustrated in FIGURE 8 utilizes three fluid pressures to engage the clutches. In low range a fluid pressure of 450 p.s.i. is supplied to the low range clutch and to the speed clutches. In medium range a fluid pressure of 200 p.s.i. is supplied to the medium range clutch and the speed clutches. In high range a fluid pressure of 100 p.s.i. is supplied to the high range clutch and the speed clutches. The accumulator disclosed in FIGURE 9 supplies the necessary fluid to fill the cavity and reduces the pressure of the fluid utilized to engage the clutches to a pressure below the desired pressure. After the clutches are engaged at the lower pressure the accumulator permits the pressure to gradually build up to the desired pressure. For example, when the vehicle is in high range the accumulator is charged to 100 p.s.i., and the pressure in conduit 386, which supplies fluid to the accumulator, and conduit 388 is controlled by the circuitry previously described. Under 100 p.s.i. pressure of fluid supplied to inlet 458 the piston 448 is moved against the force of spring 464 so that the cylinder 444 contains approximately 9 cubic inches of fluid (see FIG. 10). When a speed clutch is engaged in high range, the spring 464 moves the piston 448 so that 7 cubic inches of the fluid flows from cylinder 444 through outlet conduit 462 and is conducted through conduit 354 to the programming valve 336 and then to the speed clutch engaged (see FIG. 8).

There is a supply of fluid available to the accumulator at the preselected pressure. The volume of this fluid is metered by restrictor 460. During the clutch engaging procedure this volume of fluid is added to the fluid emptied from cylinder 444. For example, only assume approximately 6 cubic inches of fluid is withdrawn from cylinder 444 and 1 cubic inch of fluid is supplied by conduit 386. In this manner the cavity within the clutch housing is quickly filled with fluid and the plates are engaged at a pressure of approximately 25 or 30 p.s.i. which provides a soft engagement of the clutch plates. (See FIGURE 10 where pressure of fluid in accumulator is graphically illustrated for various volumes of fluid within the accumulator.) The fluid then supplied to accumulator 386 from conduit 380 moves the piston 448 in cylinder 444 to replenish the fluid used to charge the clutch and simultaneously increases the pressure on the clutch plates from the engaging pressure of 25 p.s.i. to the 100 p.s.i. operating pressure.

In medium range the accumulator is charged to 200 p.s.i. and the fluid under 200 p.s.i. pressure entering through inlet 458 moves the piston 448 to compress both spring 464 and spring 466. The cumulative effect of the double spring arrangement is illustrated in FIGURE 10. Spring 466 remains inactive until the pressure on piston 448 exceeds approximately 125 p.s.i. At pressures in excess of 125 p.s.i. both springs 464 and 466 cumulatively oppose the fluid pressure. The cumulative effect of the springs 464 and 466 reduces the increase in volume for the further increase in pressure. For example, when only spring 464 is active, an increase of 125 p.s.i. increases the volume of fluid within the accumulator by 11.6 cubic inches. When both springs 464 and 466 are active, an increase of 325 p.s.i. only increases the volume within the accumulator by 7.4 cubic inches. At 200 p.s.i. the cylinder contains approximately 13 cubic inches fluid. When one speed clutch is disengaged and another speed clutch is engaged, the accumulator provides approximately 6 cubic inches of fluid to the newly engaged clutch housing and the pressure of the fluid in the conduit 354 is reduced from 200 p.s.i. to approximately 75 p.s.i. The fluid at 200 p.s.i. supplied to accumulator 384 at a controlled rate again moves the piston against both springs 464 and 466 to gradually increase the pressure on the newly engaged clutch plates from 75 p.s.i. to 200 p.s.i., thus again providing for soft clutch engagement in various speeds and intermediate range. The lower pressure in medium range is, however, substantially higher than the lower pressure in high range.

When the transmission is in low range the accumulator cylinder 444 contains approximately 19 cubic inches of fluid and the pressure in conduit 354 is at 450 p.s.i. When a speed shift is made in low range the 7 cubic inches of fluid required to quickly fill the clutch housing is supplied by both the accumulator and the input through conduit 386. Assuming that the metered flow through conduit 386 supplies one cubic inch of fluid in the predetermined time, the other 6 cubic inches are supplied by the accumulator so that the clutch plates are engaged at a pressure of not 450 p.s.i., but of approximately 180 p.s.i., to provide smooth shifting in the various speeds in low range. Again it should be noted, however, that the engaging pressure in low range is substantially higher than the engaging pressure in medium or low range. Thus the accumulator, although providing soft engagement in the various ranges, provides clutch engaging pressure sufficient to overcome the torque exerted on the clutches in the various ranges.

When both a speed and range clutch are simultaneously actuated such as a change from low range fourth speed to medium range first speed, two clutches must be simultaneously engaged. At 450 p.s.i. the accumulator contains approximately 19 cubic inches of fluid. The requisite amount of fluid to fill both clutches being 14 inches and one cubic inch being supplied by the continuous flow through conduit 386 requires the accumulator 384 to supply 13 cubic inches of fluid to the respective medium range clutch and first speed clutch. Both clutches are, therefore, engaged at a pressure of about 75 p.s.i. Since the pressure to conduit 380 is regulated to 200 p.s.i. instead of 400 p.s.i. by the previously described circuit, the pressure will increase from 75 p.s.i. to 200 p.s.i. and the accumulator will contain approximately 13 cubic inches of fluid available for the various change speed clutches within medium range.

It should be understood, although specific pressures and volumes have been discussed in describing the above accumulator and control system, the accumulator and control system herein described are all equally applicable to other pressures and other volumes and the pressures and volumes described are for exemplary purposes only.

The springs 464 and 466 within accumulator 384 are so proportioned to provide a nearly constant volume in all ratios to the various clutches. The springs 464 and 466 function cumulatively in pressures above approximately 125 p.s.i. as illustrated in FIGURE 10. Up to approximately 125 p.s.i. the spring 466 is inactive and spring 464 controls the volume of fluid within the accumulator 384. Above 125 p.s.i. both springs 464 and 466 become active in that both springs are compressed under pressures higher than 125 p.s.i.

According to the provisions of the patent statutes, we have explained the principle, preferred construction, and mode of operation of our invention and have illustrated and described what we now consider to represent its best embodiment. However, we desire to have it understood that, within the scope of the appended claims, the invention may be practiced otherwise than as specifically illustrated and described.

We claim:

1. In a transmission mechanism having a plurality of speeds in both directions the combination comprising a transmission housing, four countershafts arranged in parallel spaced relation to each other within said housing and adapted to rotate in both directions, constant mesh gearing arranged within said housing, said gearing including separate directional gears, separate change speed gears and separate range gears, said gearing arranged coaxially on certain of said shafts, output means driven by an element of said transmission, a pair of directional clutches, a plurality of change speed clutches, and a pair of range clutches, said clutches arranged coaxially on certain of said shafts, said directional clutches adapted upon engagement to regulate the direction of rotation of a pair of said countershafts, said change speed clutches adapted upon selective engagement to transmit the rotation of said pair of countershafts to a third countershaft in a selected speed, and said range clutches adapted upon selective engagement to transmit rotation of said third countershaft to said output means at still another predetermined speed thereby providing two speed ranges in each speed selected by said change speed clutches.

2. In a transmission mechanism having six speeds in both forward and reverse direction the combination comprising a transmission housing, four countershafts arranged in parallel spaced relation to each other in said housing, said countershafts arranged to rotate in both directions, constant mesh gearing arranged within said housing, said constant mesh gearing including separate directional gears, separate change speed gears and separate range gears, said gearing arranged coaxially on certain of said shafts, output means drivingly connected to one of said range gears, a pair of directional clutches, a plurality of change speed clutches, and a pair of range clutches, said clutches arranged coaxially on certain of said shafts, said directional clutches adapted upon engagement to regulate the direction of rotation of a pair of said countershafts, said change speed clutches adapted upon selective engagement to transmit the rotation of said pair of countershafts to a third countershaft in a selected speed, gearing connecting said third countershaft to said fourth countershaft, one of said range clutches adapted upon engagement to drivingly connect said third countershaft to said output means to thereby transmit rotation directly from said third countershaft to said output means in a predetermined range, another of said range clutches adapted upon engagement to drivingly connect said fourth countershaft to said output means to thereby transmit rotation from said third countershaft to said output means through said fourth countershaft.

3. A transmission as set forth in claim 2 in which said output means includes a tubular shaft coaxially positioned on said third countershaft in rotatable relation thereto, and said first named range clutch adapted upon engagement to frictionally engage said third countershaft to said tubular shaft.

4. A transmission as set forth in claim 3 in which said first named range clutch is positioned exteriorly of said transmission housing and includes an outer casing secured to and rotatable with said tubular shaft, and an output shaft secured to said casing exteriorly of said housing.

5. A transmission as set forth in claim 4 which includes a second tubular shaft arranged coaxially on said fourth countershaft in rotatable relation thereto, and said second named range clutch adapted upon engagement to frictionally engage said second tubular shaft to said fourth countershaft.

6. In a constant mesh transmission having six speeds in both forward and reverse direction the combination comprising a transmission housing, a first countershaft, a second countershaft, a third countershaft, and a fourth countershaft, all of said countershafts arranged in parallel spaced relation to each other, first and second tubular shafts coaxially positioned on said first countershaft in rotatable relation thereto, third and fourth tubular shafts coaxially positioned on said second tubular shaft in rotatable relation thereto, fifth and sixth tubular shafts coaxially positioned on said third countershaft in rotatable relation thereto, a seventh tubular shaft coaxially positioned on said fourth countershaft in rotatable relation thereto, said first, second and third countershafts having their end portions projecting from said housing, said fourth countershaft having one end portion projecting from said housing, said tubular shafts having portions projecting from said housing, an input shaft journaled in said housing, a first spur gear secured to and rotatable with said input shaft, a first directional gear secured to said first tubular shaft and rotatable therewith, said first directional gear meshing with said first spur gear, a second directional gear secured to said fifth tubular shaft and rotatable therewith, said first directional gear meshing with said second directional gear, a first connecting spur gear secured to and rotatable with said first countershaft, a second connecting gear secured to and rotatable with said third tubular shaft, said first connecting gear meshing with said second connecting gear, a third connecting gear secured to and rotatable with said third countershaft, said second connecting gear meshing with said third connecting gear, a first change speed gear secured to said sixth tubular shaft and rotatable therewith, a second spur gear secured to and rotatable with said second countershaft, said first change speed gear meshing with said second spur gear, a second change speed gear secured to and rotatable with said second tubular shaft, a third spur gear secured to and rotatable with said second countershaft, said second change speed gear meshing with said third spur gear, a fourth spur gear secured to and rotatable with said fourth countershaft, said fourth spur gear meshing with said third spur gear, a fifth spur gear secured to and rotatable with said seventh tubular shaft, a sixth spur gear secured to and rotatable with said fourth tubular shaft, said fifth spur gear meshing with said sixth spur gear, a forward directional clutch positioned exteriorly of said housing and arranged to frictionally engage said first tubular shaft to said first countershaft, a reverse directional clutch positioned exteriorly of said housing and arranged to engage said fifth tubular shaft to said third countershaft, a low range clutch positioned exteriorly of said housing and arranged to engage said seventh tubular shaft to said fourth countershaft, a high range clutch positioned exteriorly of said housing and arranged to engage said fourth tubular shaft to said second countershaft, a first change speed clutch positioned exteriorly of said housing and arranged to frictionally engage said sixth tubular shaft to said third countershaft, a second change speed clutch positioned exteriorly of said housing and arranged to engage said second tubular shaft to said first countershaft, a third change speed clutch positioned exteriorly of said housing and arranged to engage said third tubular shaft to said second countershaft, and output means connected to said fourth tubular shaft, said directional clutches adapted upon selective engagement to rotate said connecting gears and said first and third countershafts in a given direction, said change speed clutches arranged upon selective engagement to rotate said second countershaft at a predetermined selected speed, said range clutches arranged upon selective engagement to rotate said output means at a predetermined selected range in said selected speed.

7. A controlled pressure actuating circuit comprising a plurality of pressurized fluid actuated mechanisms, a source of pressurized fluid, conduit means joining said source to said mechanisms, programming means associated with said conduit means to selectively actuate said mechanisms, pressure control means associated with said conduit means, said pressure control means actuatable to reduce the maximum fluid pressure in said conduit means, and pressure control actuating means operatively connecting said pressure control means and at least one of said mechanisms to actuate said pressure control means upon actuation of said one mechanism.

8. A controlled pressure actuating circuit comprising a plurality of pressurized fluid actuated mechanisms, a source of pressurized fluid, conduit means joining said source to said mechanisms, programming means associated with said conduit means to selectively actuate said mechanisms, pressure control means associated with said conduit means, said pressure control means actuatable by pressurized fluid to reduce the maximum fluid pressure in said conduit means, and a pressure control actuating conduit extending from one of said mechanisms to said pressure control means to conduct pressurized fluid for actuating said pressure control means when said one mechanism is actuated.

9. A controlled pressure actuating circuit comprising a plurality of pressurized fluid actuated mechanisms including a first mechanism adapted to be actuated by fluid pressure at two different pressure values and a second mechanism adapted to be actuated by fluid under pressure at one pressure value, a source of pressurized fluid, conduit means joining said source to said mechanisms, programming means associated with said conduit means to selectively actuate said first mechanism, valve means associated with said conduit means to selectively actuate said second mechanism, pressure control means associated with said conduit means and actuatable to reduce the maximum fluid pressure input to said first mechanism, and pressure control actuating means operatively connecting said pressure control means to said second mechanism to actuate said pressure control means and thereby reduce the pressure to said first mechanism when said second mechanism is actuated.

10. A controlled pressure actuating circuit comprising a plurality of pressurized fluid actuated mechanisms adapted to be actuated at a plurality of different preselected fluid pressures, a source of pressurized fluid, conduit means joining said source to said mechanisms, pressure control means associated with said conduit means and arranged to control the pressure in said conduit to said mechanisms, programming means in said conduit upstream of said pressure control means, said programming means arranged to selectively control the actuation of said mechanisms, and said programming means associated with said pressure control means and arranged to control the actuation of said pressure control means to provide a preselected fluid pressure for said pressurized fluid actuated mechanisms.

11. A controlled pressure actuating circuit comprising a plurality of pressurized fluid actuated range clutches and a plurality of pressurized fluid actuated speed clutches, a source of pressurized fluid, a first programming valve arranged to selectively actuate said range clutches and a second programming valve arranged to selectively actuate said speed clutches, conduit means joining said source with both of said programming valves, other conduit means connecting said programming valves with said respective clutches, selector means arranged to selectively control the actuation of said programming valves, pressure control means in said conduit between said source of pressurized fluid in said programming valves, means connecting said first programming valve to said pressure control means, said pressure control means responsive to said first programming valve to control the pressure of said fluid in said conduit means and to said range and speed clutches, and said first programming valve arranged upon actuation of said respective range clutches to control the actuation of said pressure control means and thereby control pressure of said fluid conducted to said preselected range and speed clutches.

12. A controlled pressure actuating circuit comprising fluid actuated means, a source of pressurized fluid, a conduit connecting said fluid actuated means and said source of pressurized fluid, valve means in said conduit between said fluid actuated means and said source of pressurized fluid, actuator means for said valve means, fluid reservoir means in said conduit between said valve means and said fluid actuating means, said fluid reservoir means including means to deliver a preselected volume of fluid to said fluid actuated means, and means connecting said valve means to said fluid reservoir means, said fluid actuated means arranged to be engaged by fluid under pressure supplied by said source of pressurized fluid through said conduit and to be disengaged by the venting of said conduit to atmospheric pressure, said actuator means arranged to position said valve means to vent said conduit to atmospheric pressure and thereby disengage said fluid actuated means, said actuator means arranged thereafter to actuate said means in said fluid reservoir means and deliver a preselected volume of fluid to said fluid actuated means to thereby engage said fluid actuated means at a preselected pressure and to concurrently supply fluid to said conduit at said preselected pressure, said actuator means arranged to subsequently open said valve means to increase the fluid pressure in said conduit means to a preselected higher fluid pressure.

13. A controlled pressure actuating circuit for a fluid pressure actuated clutch comprising a fluid pressure actuated clutch requiring a preselected volume of fluid to move the clutch elements into engagement, a source of pressurized fluid, a conduit connecting said clutch to said source of pressurized fluid, a valve in said conduit arranged to control the pressure of said fluid delivered to said clutch, an accelerating cylinder in said conduit between said valve and said clutch, said cylinder arranged to retain a preselected volume of fluid, a piston within said cylinder arranged upon movement therein to deliver said preselected volume of fluid to said conduits to thereby engage said clutch elements, multi-position regulator means for said valve means, other conduit means connecting said valve means to said cylinder, said fluid pressure actuated clutch arranged to be engaged by fluid under pressure supplied by said source of pressurized fluid through said first-named conduit and to be disengaged by the venting of said first-named conduit to atmospheric pressure, said regulator means arranged in one position to open said valve and vent said first-named conduit to atmospheric pressure to thereby disengage said clutch, said regulator means arranged in a second position to deliver fluid at a preselected pressure through said other conduit to said cylinder to thereby move said piston within said cylinder and deliver said preselected volume of fluid to said clutch and engage said clutch elements, said regulator means arranged in said second position to open said valve means to deliver fluid to said conduit at a preselected low pressure to thereby maintain said clutch elements engaged at said preselected low pressure, said regulator means arranged in other subsequent positions to open said valve to increase the fluid pressure in said conduit.

14. An accumulator device to supply substantially the same volume of fluid to a plurality of pressure actuated mechanisms arranged to be actuated at different pressure values, said accumulator device comprising a cup shaped cylinder, a piston positioned within said cylinder and movable axially therein, an end closure positioned in said cylinder open end portion, said end closure having a fluid inlet port communicating with the inner cavity of said cylinder, said end closure having an outlet port communicating with said cylinder inner cavity, a first spring positioned within said cylinder and having one end portion abutting said cylinder cup shaped end wall and the other end portion abutting said piston, said first spring urging said piston into abutting relation with said end closure, and a second spring positioned in said cylinder in axial alignment with said first spring, one end portion of said spring abutting said cylinder cup shaped end wall and the other end portion spaced from said piston a predetermined distance, said first spring constructed and arranged to deflect a predetermined distance under a first preselected fluid pressure on said piston to thereby permit said piston to move away from said end closure a predetermined distance and provide a cavity for a preselected volume of fluid in said cylinder at said first preselected pressure, said first and second springs constructed and arranged to deflect a second predetermined distance under a second preselected fluid pressure on said piston to thereby permit said piston to move away from said end closure a second predetermined distance and provide a cavity for a second preselected volume of fluid in said cylinder at said second preselected pressure.

15. An accumulator device as set forth in claim 14 in which said springs are coil springs and said second spring is positioned within the axial passageway of said first spring.

16. The combination comprising a transmission mechanism having a plurality of gears and shafts operable to be drivingly connected through a plurality of clutches, said clutches selectively engageable to effect a plurality of transmission speeds, said clutches operable to be engaged when pressurized fluid is conducted thereto, a source of pressurized fluid, conduit means operable to join said source of pressurized fluid to each of said clutches, transmission programming means associated with said conduit means and positionable to direct pressurized fluid through said conduit means from said source to said clutches, pressure control means associated with said conduit means, said pressure control means actuatable to reduce the maximum pressure of fluid input to said clutches from said source, and pressure control actuating means operatively connected to at least one of said clutches to actuate said pressure control means upon engagement of said one clutch.

17. The combination comprising a hydro-kinetic torque converter including an impeller member, a turbine member, a stator member, and a converter lock-up unit operable to engage said impeller member and said turbine member for rotation together when pressurized fluid is conducted to said lock-up unit, a transmission mechanism driven through said torque converter and having a plurality of gears and shafts operable to be drivingly connected through directional clutches, range clutches, and change speed clutches, said clutches engageable to effect a plurality of transmission speeds in both directions, each of said clutches operable to be engaged when pressurized fluid is conducted thereto, each of said transmission speeds being effected by the simultaneous engagement of a directional clutch, a range clutch, and a change speed clutch, a source of pressurized fluid, conduit means operable to join said source of pressurized fluid to each of said clutches, transmission programming means in said conduit means positionable to direct pressurized fluid through said conduit means to a directional clutch, a change speed clutch, and a range clutch simultaneously, pressure control means associated with said conduit means, said pressure control means actuatable by fluid pressure to reduce the maximum pressure of fluid input from said source to said transmission programming means, a converter lock-up conduit to connect said converter lock-up unit to said source of pressurized fluid, a valve in said lock-up conduit to selectively permit passage of pressurized fluid from said source to said lock-up unit, an actuating conduit joined to said pressure control means to admit pressurized fluid to said pressure control means for actuating purposes, and connecting conduit means joining said actuating conduit to said converter lock-up unit and one of said transmission range clutches so that pressurized fluid is admitted to said actuating conduit to actuate said pressure control means when either said converter lock-up unit, said one range clutch, or both said lock-up unit and said one range clutch have pressurized fluid conducted thereto.

18. A controlled pressure actuating circuit comprising a plurality of pressurized fluid actuated mechanisms, a source of pressurized fluid, programming means operable to selectively control the actuation of said mechanisms, pressure control means actuatable by pressurized fluid to reduce the pressure of fluid passing therethrough, first conduit means connecting said source of pressurized fluid to said pressure control means, second conduit means connecting said pressure control means to said programming means, third conduit means connecting said programming means to said pressurized fluid actuated mechanisms, and a first actuating conduit connecting one of said mechanisms to said pressure control means to actuate said pressure control means when said one mechanism is actuated, said pressure control means thereby reducing the pressure of fluid in said second and third conduit means when said one mechanism is actuated.

19. A controlled pressure actuating circuit for a multi-speed transmission having a plurality of ranges and a plurality of speeds in each range, a plurality of pressure actuated range clutches and a plurality of pressure actuated speed clutches, said pressure actuated range clutches arranged to be actuated at different preselected fluid pressures, said speed clutches arranged to be actuated at substantially the same pressure as the engaged range clutch to provide the preselected range for said speed clutches, a source of pressurized fluid, first programming means for said range clutches, second programming means for said speed clutches, a fluid pressure actuated multi-pressure control valve, a first conduit connecting said source with said pressure control valve, a second conduit connecting said pressure control valve with said first and second programming valves so that said fluid under substantially the same pressure is delivered from said pressure control valve to both of said programming valves, other conduits connecting said first programming valve to said range clutches and said second programming valve to said speed clutches, a first pilot conduit connecting said first programming valve to said pressure control valve, said first pilot conduit arranged upon actuation of one of said range clutches to supply fluid under pressure to said pressure control valve to thereby regulate pressure of the fluid flowing from said pressure control valve to a first preselected pressure so that fluid at said preselected pressure is supplied to said selected range clutch, to said second programming valve and upon actuation to any of said speed clutches, a second pilot conduit connecting said first programming valve to said pressure control valve, said second pilot conduit arranged upon actuation of another of said range clutches to supply fluid under pressure to said pressure control valve to thereby regulate the pressure of the fluid flowing from said pressure control valve to a second preselected pressure so that fluid at said second preselected pressure is supplied to said selected other range clutch, to said second programming valve and upon actuation to any of said speed clutches, a selector valve associated with said first programming valve and said second programming valve, said selector valve arranged to control the flow of fluid under pressure through said first programming valve selectively and alternatively to said range clutches and to control the flow of fluid under pressure through said second programming valve selectively and alternatively to said speed clutches, and an accumulator positioned in said second conduit between said pressure control valve and said first and second programming valves, said accumulator including pressure control means arranged to decrease the pressure of said fluid in said second conduit upon actuation of said clutches to thereby cause said clutches to initially engage at a pressure below said predetermined pressure.

20. A controlled pressure actuating circuit for a fluid pressure actuated clutch wherein said clutch requires a preselected volume of fluid to move the clutch elements into engagement and a predetermined minimum pressure to transmit a preselected torque through said clutch elements, a source of pressurized fluid, a conduit connecting said clutch to said source of pressurized fluid, a valve in said conduit arranged to regulate the pressure of said fluid in said conduit and thereby control the pressure of said fluid delivered to said clutch, an accelerating cylinder in said conduit between said valve and said clutch, a piston within said cylinder forming a chamber, spring means urging said piston against a stop means so that said accelerating cylinder with said piston abutting said stop means retains a preselected volume of fluid in said chamber substantially the same as the volume of fluid required to engage said clutch elements, conduit means connecting said valve and said accelerating cylinder and arranged to supply fluid under pressure to said cylinder to move said piston in said chamber and discharge said fluid in said chamber into said conduit, a multi-position actuator connected to said valve, said actuator arranged in one position to position said valve to vent said first-named conduit to atmospheric pressure and thereby disengage said clutch, said actuator arranged in a second position to deliver fluid at a pressure substantially equal to the minimum pressure required to transmit a preselected torque through said clutch elements to said conduit connecting said valve and said clutch, said actuator arranged in said second position to simultaneously deliver fluid at a pressure substantially greater than said minimum pressure through said conduit means to said cylinder to move said piston in said chamber and discharge said preselected volume of fluid in said conduit so that said clutch is substantially simultaneously provided with a preselected volume of fluid to move the clutch elements into engagement and subject said clutch elements to a preselected minimum pressure, and said actuator arranged in other subsequent positions to increase the pressure of said fluid in said conduit above said minimum pressure.

No references cited.

DON A. WAITE, *Primary Examiner.*